(12) United States Patent
Senkel et al.

(10) Patent No.: US 10,752,372 B2
(45) Date of Patent: *Aug. 25, 2020

(54) AIRCRAFT

(71) Applicant: Volocopter GmbH, Bruchsal (DE)

(72) Inventors: Thomas Senkel, Berlin (DE); Stephan Wolf, Karlsruhe (DE); Alexander Zosel, Rheinstetten (DE)

(73) Assignee: Volocopter GmbH, Bruchsal (DE)

( * ) Notice: Subject to any disclaimer, the term of this patent is extended or adjusted under 35 U.S.C. 154(b) by 269 days.

This patent is subject to a terminal disclaimer.

(21) Appl. No.: 15/607,668

(22) Filed: May 29, 2017

(65) Prior Publication Data

US 2017/0267367 A1 Sep. 21, 2017

Related U.S. Application Data

(63) Continuation of application No. 14/380,499, filed as application No. PCT/EP2013/053352 on Feb. 20, 2013, now Pat. No. 9,663,237.

(30) Foreign Application Priority Data

Feb. 22, 2012 (DE) .................. 10 2012 202 698
Feb. 22, 2012 (DE) .................. 20 2012 001 750 U

(51) Int. Cl.
*B64D 31/06* (2006.01)
*B64D 27/24* (2006.01)
(Continued)

(52) U.S. Cl.
CPC .............. *B64D 31/06* (2013.01); *B64C 25/34* (2013.01); *B64C 25/52* (2013.01); *B64C 25/56* (2013.01);
(Continued)

(58) Field of Classification Search
CPC .................. G05D 1/0858; B64C 2201/20
See application file for complete search history.

(56) References Cited

U.S. PATENT DOCUMENTS 3,591,109 A * 7/1971 McLarty ............... B64C 1/06
244/17.23
3,889,902 A * 6/1975 Madet .................. B64C 27/04
244/17.23
(Continued)

FOREIGN PATENT DOCUMENTS

| DE | 102005010336 | 5/2006 |
| DE | 102006021182 | 11/2007 |
| GB | 2468787 | 9/2010 |
| WO | 2008147484 | 12/2008 |

*Primary Examiner* — Thomas G Black
*Assistant Examiner* — Sara J Lewandroski
(74) *Attorney, Agent, or Firm* — Volpe and Koenig, P.C.

(57) ABSTRACT

A vertical takeoff and landing aircraft (101) for transporting persons or loads, including a plurality of preferably equivalent and redundant electric motors (3) and propellers (2), substantially arranged in one surface, wherein each propeller is assigned an individual electric motor to drive the propeller, the aircraft being characterized in that at least one attitude sensor is provided for attitude control of the aircraft (101) in an active signal connection to at least one signal processing unit which is designed or set up to automatically perform the attitude control based on measurement data from the attitude sensor by regulating the speed of at least some of the electric motors (3), preferably with signal actions of the speed controller assigned to each electric motor such that the aircraft (101) is positioned in space with the surface defined by the propeller (2) substantially horizontal at all times, without control input by a pilot or a remote control.

10 Claims, 18 Drawing Sheets

(51) Int. Cl.
*B64D 25/00* (2006.01)
*B64D 17/80* (2006.01)
*B64D 11/06* (2006.01)
*B64C 39/02* (2006.01)
*B64C 27/473* (2006.01)
*B64C 27/20* (2006.01)
*B64C 27/14* (2006.01)
*B64C 27/08* (2006.01)
*B64C 25/56* (2006.01)
*B64C 25/52* (2006.01)
*B64C 25/34* (2006.01)
*G05D 1/08* (2006.01)
*B64D 31/04* (2006.01)
*B64C 29/00* (2006.01)

(52) U.S. Cl.
CPC .............. *B64C 27/08* (2013.01); *B64C 27/14* (2013.01); *B64C 27/20* (2013.01); *B64C 27/473* (2013.01); *B64C 29/0025* (2013.01); *B64C 39/024* (2013.01); *B64D 11/0689* (2013.01); *B64D 17/80* (2013.01); *B64D 25/00* (2013.01); *B64D 27/24* (2013.01); *B64D 31/04* (2013.01); *G05D 1/0858* (2013.01); *Y02T 50/64* (2013.01)

(56) References Cited

U.S. PATENT DOCUMENTS

| | | | |
|---|---|---|---|
| 2005/0061910 A1* | 3/2005 | Wobben | B64C 27/20 244/17.23 |
| 2005/0098682 A1* | 5/2005 | Pai | B64C 27/10 244/17.11 |
| 2006/0266881 A1* | 11/2006 | Hughey | B64C 27/08 244/17.23 |
| 2009/0008499 A1* | 1/2009 | Shaw | B64C 27/20 244/17.23 |
| 2011/0017865 A1* | 1/2011 | Achtelik | B64C 27/08 244/17.23 |
| 2011/0226892 A1* | 9/2011 | Crowther | B64C 1/30 244/17.23 |
| 2012/0158215 A1* | 6/2012 | Sun | B64C 27/20 701/3 |
| 2012/0241553 A1* | 9/2012 | Wilke | B64C 27/08 244/17.13 |
| 2012/0298793 A1* | 11/2012 | Weddendorf | F03D 5/00 244/17.23 |
| 2013/0206919 A1* | 8/2013 | Shachor | B64C 39/022 244/23 A |
| 2014/0061376 A1* | 3/2014 | Fisher | B64D 27/24 244/62 |
| 2015/0232181 A1* | 8/2015 | Oakley | B64C 39/024 701/2 |

* cited by examiner

AIRCRAFT

CROSS REFERENCE TO RELATED APPLICATIONS

This application is a continuation of pending U.S. application Ser. No. 14/380,499, filed Aug. 22, 2014, which is a 371 of International Application No. PCT/EP2013/053352, filed Feb. 20, 2013, which claims priority to DE 102012202698.3 filed Feb. 22, 2012 and DE 202012001750.0 filed Feb. 22, 2012, all of which are hereby incorporated by reference as if fully set forth

BACKGROUND

The present invention relates to a vertical take-off and landing aircraft for transporting people or loads (cargo) with a plurality of electric motors and propellers that are advantageously identical and redundant and arranged essentially in a surface or plane, wherein an electric motor is allocated to each propeller for driving the propeller, according to the preamble of claim 1.

Such aircraft are also known according to the designation VTOL for "vertical take-off and landing." In the present description, the designation "multicopter" is also used as an alternative. In this context the invention is not restricted to aircraft that are controlled by a pilot inside the aircraft, but also relates to aircraft that can be used for the remote-controlled or autonomous transport of corresponding cargo.

Vertical take-off aircraft with a plurality of propellers or rotors are known. As drives, internal combustion engines were regularly used, which, however, could be controlled only slowly and relatively imprecisely. In this way, fast attitude control for the aircraft is practically impossible. For this reason, for example, for known aircraft in the form of helicopters, a blade adjustment of the rotors is provided for faster attitude control. This leads, however, to a significantly increased expense in terms of construction and costs and to considerable wear during operation.

In the field of model making, aircraft with four or six propellers and an electric drive are known in which the attitude control in flight is achieved through fast changes in the rotational speed of the electric drives being used. A simple upscaling of this design for the construction of aircraft that can carry people, however, would leave to considerable safety risks, because if only one electric motor were to fail, it would no longer be possible to control the aircraft. Also, for larger-scale propellers, the necessary time period for changing the thrust would be so large that fast attitude control would also not be possible.

From GB 2 468 787 A, an aircraft is known that is constructed fundamentally like a conventional fixed-wing aircraft. To be able to take off and land vertically, it has a plurality of electric jet engines that are formed as ducted fan engines and can be pivoted. The advantage of higher static thrust of the ducted fan engines is counteracted by significant disadvantages, for example, the increased manufacturing expense with tight tolerances and the relatively poor aerodynamics for forward flight.

From US 2006/0266881 A1, an aircraft according to the class is known with a plurality of electrically driven rotors or propellers. The described aircraft has propellers that lie on different planes, wherein the circular area of the rotors overlap. This can also cause aerodynamic disadvantages. For driving the propellers, electric motors with brushes and gears are used and this means a relatively high amount of wear and maintenance expense. In addition, the pilot alone is responsible for the attitude control of the known aircraft by means of the control stick, which basically rules out use of the aircraft for persons without appropriate training and experience.

SUMMARY

The invention is based on the objective of creating a cost-efficient, low-wear, low-maintenance aircraft of the type named above, which can be easily and safely used by people with little or even no flight training. The aircraft is also to be suitable for use as a person-carrying aircraft or for the remote-controlled or autonomous transport of cargo.

This objective is met by a vertical take-off and landing aircraft with one or more features of the invention. Advantageous refinements of the invention are the subject matter of the claims, whose wording is here incorporated into the description through explicit reference, in order to avoid the repetition of text.

According to the invention, a vertical take-off and landing aircraft for transporting people or loads with a plurality of electric motors and propellers that are advantageously identical and redundant and arranged essentially in a surface or plane, wherein a separate electric motor is allocated to each propeller for driving the propeller, is characterized in that, for the attitude control of the aircraft, at least one attitude sensor is provided in active signal connection with at least one signal processing unit, wherein this signal processing unit is constructed or designed to automatically carry out the attitude control under consideration of measurement data of the attitude sensor by controlling the rotational speed of at least one part of the electric motors, advantageously through signal actions on rotational speed setters allocated to each electric motor, so that the surface or plane defined by the propellers of the aircraft is oriented essentially horizontally in space at all times without control inputs of a pilot or a remote controller.

The attitude control of the aircraft according to the invention described above makes sure that the aircraft is always horizontal in space without control inputs from a pilot or remote controller. The term "horizontal in space" should be understood to mean an orientation in which a surface defined by the propellers that are arranged essentially in a plane is aligned horizontally in space, i.e., approximately parallel to the ground or with its normal vector parallel to the direction of the acceleration of gravity. This corresponds to a resting, suspended state of the aircraft. The attitude control is carried out—as already stated—under consideration of measurement data of the at least one attitude sensor, wherein this measurement data is processed or evaluated by the at least one signal processing unit with respect to signal processing and/or computing. A corresponding generated attitude control signal of the signal processing unit is used to control the rotational speed of at least one part of the drive motors (electric motors). In addition, the attitude control is carried out, as also already stated, automatically, and is designed so that the aircraft is horizontal in space, especially without control inputs of a pilot and a remote controller.

In the course of a first refinement of the present invention, it is provided that the signal processing unit is constructed as a microprocessor, digital signal processor, microcontroller, FPGA (field programmable gate array), digital controller, analog processor, analog computer, analog controller, such as PID controller, or as a hybrid processing unit made from analog and digital elements. In this way, the attitude control of the aircraft can be flexibly adapted to the specific circuitry and/or legal approval specifications.

In the course of another refinement of the aircraft according to the invention, it is provided that the pilot performs his or her control inputs with the help of a control stick or joystick that is connected to an electronic control unit comprising at least the signal processing unit, the position sensor, and optionally additional components. The control data of the pilot or alternatively a remote controller is superimposed on the sensor data and the rotational speed of the electric motors are adapted accordingly, so that the desired flight attitude or speed in one direction is achieved.

In the course of an especially advantageous refinement of the aircraft according to the invention it is provided that at least some number of electric motors is constructed as brushless direct-current motors (BLDC). In this way a low-wear and low-maintenance, and thus, in particular, cost-effective realization is achieved.

A different refinement of the aircraft according to the invention provides that the active connection between each electric motor and the associated propeller has a gear-less design like a direct drive. Such a realization also contributes to an especially cost-effective construction of the aircraft. In addition, by eliminating gears, a reduction of the aircraft mass is achieved, which has a positive effect on the cargo load that can be transported.

To keep the required area and accordingly the external dimensions and also the weight of the aircraft as small as possible, another refinement of the aircraft according to the invention provides that the electric motors and propellers are arranged in at least a basic hexagonal pattern.

Especially preferred is a double hexagonal arrangement of the electric motors and propellers, from which—while maintaining a central area that will be discussed in more detail below—an extremely preferred number of electric motors and propellers is advantageously 18. In principle, a corresponding refinement of the aircraft according to the invention provides, in general, that this has at least twelve electric motors and propellers.

Although it is basically within the scope of the present invention to arrange the propellers or rotors in an overlapping arrangement, another preferred refinement of the aircraft according to the invention provides that the propellers are arranged essentially in a common plane, wherein this plane is defined by the circular areas of the rotors covered by the propellers and wherein the propellers and rotors do not overlap each other.

So that the aircraft has the greatest possible stability with minimal weight, another extremely preferred refinement of the aircraft according to the invention provides that at least the electric motors and propellers, as well as optionally additional components of the aircraft, are arranged on a frame supporting structure, wherein the frame is formed from a space framework with advantageously tension-resistant and compression-resistant bars. The bars are connected to each other by means of node points and force is introduced into the node points of the space framework, especially the introduction of weight and thrust forces caused by the electric motors and propellers.

In this document, the term "space framework" is used to designate a structure made from interconnected bars or the like that are arranged not flat in a plane, but instead three-dimensionally in space. Especially compared with the model making aircraft mentioned above, this produces a clear improvement in the stability that can be achieved, because such model making aircraft use regular beams that are loaded with bending and torsion moments accordingly by the components of the aircraft, especially the propellers and motors. The proposed use of a space framework in the aircraft according to the invention contributes to the condition that the bars of the frame supporting structure are each loaded only with tension and compression, which means the multicopter described in this document can safely support and transport relatively large cargo loads with its electric drive.

To reduce the resulting noise load if possible during the operation of the aircraft according to the invention, another refinement provides that the propellers are spaced as far as possible from the bars of the space framework. The term "spaced as far as possible" is used here to mean that the propellers are arranged on the longest possible, but sufficiently stable propeller shafts, so that for a required stability, a large distance from the mentioned bars of the space framework is achieved. Additionally or alternatively, it can be provided that the bars have an aerodynamic design at least in the area of the propellers, advantageously they have an approximately drop-shaped cross section, in order to produce as little flow resistance as possible with respect to the propeller air stream. Here it is useful if the rounded front side of the drop profile is turned toward the propeller. As is known to someone skilled in the art, however, the bar cross section is not restricted to the drop-like shape mentioned in the present example, but could also be any other aerodynamically favorable shape.

As already mentioned, the attitude control in an aircraft according to the invention involves the pure electronic rotational speed change of individual electric motors. Therefore it is not required to provide a blade adjustment for the individual propellers, which is thus different than in previously known aircraft. In this context, another refinement of the aircraft according to the invention provides that the propellers are essentially rigid and without blade adjustment. Here, the roots of the rotor blades of the propellers can have a defined flexibility for compensating for flapping and oscillating movements, wherein these flapping and oscillating movements are also known from previously known aircraft, such as helicopters or the like. Advantageously, the propellers are constructed with a fiber-reinforced plastic material, wherein the blade root can have an increased flexibility due to an only unidirectional alignment of the fibers in this area. Rigid propellers without blade adjustment have significantly lower wear, are more maintenance friendly, and have greater operational safety compared with propellers with blade adjustment or articulated joints.

As already mentioned, the aircraft according to the invention has, in the course of a corresponding refinement, at least twelve or more propellers and a corresponding number of electric motors. This contributes decisively to a minimization of safety risks during flight operation. Advantageously, in this context, the signal processing unit and attitude sensors are also designed with at least one degree of redundancy, in order to further increase the degree of fail safety.

The use of many, relatively small propellers makes it possible—different than in previously known rotor aircraft—in a corresponding refinement of the aircraft according to the invention, to install and use an emergency parachute for the whole aircraft, including pilot and/or cargo, by leaving free a central area.

To positively affect the yaw behavior of the aircraft according to the invention, another refinement of the aircraft provides that at least one part of the propellers is arranged at an angle relative to a plane, advantageously with an angle of inclination that is at least equal in terms of magnitude, wherein the mentioned plane can be defined by the circular areas of the rotors covered by the remaining propellers that are not at an angle. The mentioned angle of inclination is advantageously approximately between 1° and 5°. Whether the mentioned angle of inclination relative to the mentioned plane is positive or negative can depend on the rotational sense of the propeller in question. Advantageously, the inclined propellers are provided on the outer corners of the mentioned hexagonal arrangement.

To be able to use the aircraft according to the invention as flexibly as possible, another refinement provides that the aircraft and here, in particular, the mentioned frame structure can be disassembled into several parts for transport. Here it has proven especially advantageous if the frame structure can be disassembled into several bracket modules each with advantageously several, for example, three electric motors and propellers. The mentioned electric motors and propellers of each bracket can be arranged in a triangle configuration. Additionally or alternatively, the aircraft can have a folding mechanism, for example, to produce a space-saving transport configuration by simply pivoting the mentioned bracket modules.

To achieve torque compensation for the aircraft according to the invention, another preferred refinement provides that the same number of counterclockwise-turning and clockwise-turning propellers are provided.

An extremely preferred refinement of the aircraft according to the invention provides that this has a cockpit or a seat for at least one pilot. The cockpit or the seat can be arranged under a plane of the propellers, advantageously approximately centrally, extremely advantageously right underneath the emergency parachute.

Another advantageous refinement of the aircraft according to the invention provides that the cockpit or the seat is suspended so that it can pivot about the pitch axis of the aircraft and advantageously on the frame structure discussed above. The suspension of the cockpit or the seat can have a detachable design, in order to detach the cockpit or the seat from the rest of the aircraft, so that, in particular, the cockpit can also move away autonomously, for example, on water or on land.

In this context, it has proven further advantageous if, in the course of another refinement, the aircraft according to the invention has landing gear with elastic, advantageously air-cushioned elements, wheels, skids, or the like. This landing gear can be arranged on the cockpit or on the seat.

To increase the range of the aircraft according to the invention, in the course of another refinement it can be provided that for supplying the electric motors at least one energy converter is provided for supplying electrical energy, especially during flight operation. This energy converter can be an internal combustion engine with a generator, a fuel cell arrangement, or the like, also a combination of these elements. It is further advantageous if at least one energy accumulator is provided for buffering the supplied electrical energy. This energy accumulator can be constructed as a battery, supercapacitor, or the like, also, in turn, a combination of these elements. In this context, it could be further provided that the energy accumulator and the electric motors are in active electrical connection, in order to supply the electric motors with electrical energy buffered in the energy accumulator. The energy converter discussed above is also designated as a "range extender" in the course of the present description.

In the course of another refinement of the aircraft according to the invention, the energy accumulator can be arranged so that it is located approximately centrally within the aircraft and is used for powering a plurality of electric motors. Alternatively, however, it can also be provided that the aircraft has, in the course of another refinement, multiple decentralized energy accumulators that are used for powering a sub-group of electric motors. In this context, a separate energy accumulator is extremely advantageously allocated to each electric motor.

The division of the energy accumulators discussed above (for example: batteries) into multiple blocks can be evaluated in terms of advantages and disadvantages according to various criteria. All three variants (only one central energy accumulator; two to three energy accumulators; one energy accumulator for each electric motor) are definitely useful and the decision is made in practice based on different weighting of the individual criteria. The rating is given in the sequence ++/+/o/−, wherein ++ is the best grade and − is the worst rating:

| Battery arrangement | | | |
| --- | --- | --- | --- |
| | Central | 2-3 blocks | 18 blocks |
| Failure safety | − | + | ++ |
| Handling | + | ++ | − |
| Replacing batteries | o | ++ | − |
| Housing complexity | ++ | + | − |
| Cable to motor controller | − | o | ++ |
| Cable to charger | ++ | + | − |
| BMS complexity | ++ | + | − |
| Charger complexity | + | + | o |
| Center of gravity position | + | ++ | o |
| Weight | + | o | − |
| Heating | − | o | ++ |
| On/off switch | ++ | o | − |

BMS stands for Battery Management System.

To support or accelerate the forward flight of the aircraft according to the invention, another refinement provides that the aircraft has at least one additional drive device, advantageously in the form of a drive propeller (special thrust propeller). This additional drive device can be arranged on the cockpit or the seat. It can also comprise a steering device or it can itself pivot.

An especially simple and cost-effective realization of the aircraft according to the invention is produced when it is constructed, in a refinement of the basic idea of the invention, with free-running propellers in contrast to the ducted fan engines known from the cited prior art, wherein these propellers can also advantageously have a stationary propeller shaft, that is, they cannot pivot.

The propellers or rotors being used should be, on one hand, as large as possible, in order to achieve the highest possible efficiency. On the other, they should have the smallest possible moment of inertia, in order to achieve fast changes in thrust. With these contradictory requirements, for a given motor type there is an optimum size of the propellers that can be realized for a corresponding refinement of the invention.

The power requirement P for hovering flight is given by:

$$P = \frac{1}{\zeta}\sqrt{\frac{S^3}{2\rho A}}$$

where the thrust force is S, the rotor area A, the air density $\rho$, and the efficiency factor $\zeta$. For hovering flight, the thrust force must be exactly equal to the weight.

The specific thrust S/P is given by:

$$\frac{S}{P} = \zeta\sqrt{2\rho}\sqrt{\frac{1}{S/A}}$$

Here, S/A is the rotor area loading. As can be seen, the conversion of the available power to the desired thrust becomes better with larger rotor areas (or with smaller rotor area loading).

On the other hand, the moment of inertia J of a rotor is given by:

$$J = \Sigma_i^N m_i r_i^2$$

wherein the sum is taken over a real mass distribution. Due to the required strength, the mass of the rotor also increases disproportionately with the diameter.

The torque M to be applied by the motor is given by:

$$M = J\alpha + P/\omega$$

wherein the required angular acceleration a must be determined from the dynamic response of the control processes of the entire system. The second part is produced from the resistance of the rotor and is given by the power requirement P of the rotor at the angular velocity ω.

The rotors advantageously used for a corresponding construction of the aircraft according to the invention have, in contrast to conventional airplane propellers, a very low pitch/diameter ratio of, for example, approximately 0.3, in order to make the circular area of the rotors as large as possible, but simultaneously to not let the torque, and thus the power, increase too much.

During fast forward flight, the flapping and oscillating movements typical in helicopters also occur in multicopters due to the different lift forces on the leading and returning blades of the propellers. These forces can be absorbed—as described—on the rotors through corresponding elastic construction.

As an example, the following table gives the characteristic data for three different rotor diameters, how they can be used in the scope of the present invention, wherein, a single-seat aircraft with 18 rotors is assumed, without the invention being limited to this example.

| Power requirement for different propeller sizes | | | |
|---|---|---|---|
| | Propeller | | |
| | 36" | 40" | 44" |
| Diameter [m] | 0.91 | 1.01 | 1.12 |
| Area [m^2] | 0.65 | 0.80 | 0.98 |
| Number | 18 | 18 | 18 |
| Area of air stream [m^2] | 11.7 | 14.4 | 17.7 |
| Empty weight incl. batteries [kg] | 110 | 112 | 114 |
| Pilot weight [kg] | 80 | 80 | 80 |
| Starting weight Mtow [kg] | 190 | 192 | 194 |
| Area of air stream loading [kg/m^2] | 16.2 | 13.3 | 10.9 |
| Air stream power, total [kW] | 14.9 | 13.7 | 12.5 |
| Efficiency, motor/controller | 88% | 88% | 88% |
| Efficiency factor, propeller | 75% | 75% | 75% |
| Input power [kW] | 22.6 | 20.7 | 19.0 |
| Specific thrust [N/kW] | 82 | 91 | 100 |
| Energy content, batteries [kWh] | 8.0 | 8.0 | 8.0 |
| Weight, batteries | 54 | 54 | 54 |
| Flight period [min] | 21.2 | 23.1 | 25.3 |

For better transport, in the course of a corresponding refinement of the invention, the multicopter can be either disassembled or folded together easily. This happens either through a division into individual modules that are connected to each other before the start by bolts or fasteners, through a pivoting mechanism, through a connection mechanism, or through a folding mechanism, for example, like for a rotary clothes line.

The multicopter is advantageously nearly maintenance-free. This is achieved, in the course of corresponding constructions, especially through the use of brushless electric motors that contain ball bearings as the only wear parts. Otherwise, in a corresponding construction, any mechanical mechanism is intentionally eliminated, for example, gears, sliding contacts blade adjusters, etc. These structural features achieve, in addition to a simple and maintenance-friendly design, also high reliability. Advantageously brushless external rotor motors are used that are designed, matching the propeller, for a correspondingly low rotational speed and higher torque.

The safety of the multicopter is very important. Through the preferred large number of motors (at least twelve), even if up to 30% of the motors fail, stable attitude control and a controlled emergency landing can be achieved. All systems can have a redundant design, so that in the event of a failure, there is always a replacement. In addition, advantageously at least one emergency parachute is provided for the whole aircraft (aircraft rescue system). In contrast to other rotary-wing aircraft, this is possible due to the open space toward the top, which has already been discussed above.

Obviously it is also possible to provide a plurality of emergency parachutes for the whole aircraft. Here it is especially advantageous if the suspensions (cords) of the parachute are arranged in the vicinity of or above the center of gravity of the aircraft. This also applies equally to an individual emergency parachute. As someone skilled in the art can easily see, in this context it is not necessary that all parachutes attach exactly at the center of gravity or exactly above the center of gravity, rather, an arrangement around the center of gravity is also possible, so that the emergency parachutes attach, as a collective, at the center of gravity or above the center of gravity.

To achieve the lowest possible air resistance, both the cockpit and also the support structure can be favorably designed as aerodynamic as possible.

BRIEF DESCRIPTION OF THE DRAWINGS

Additional properties and advantages of the present invention are given from the following description of embodiments with reference to the drawings.

DETAILED DESCRIPTION OF THE PREFERRED EMBODIMENTS

Figure 1:
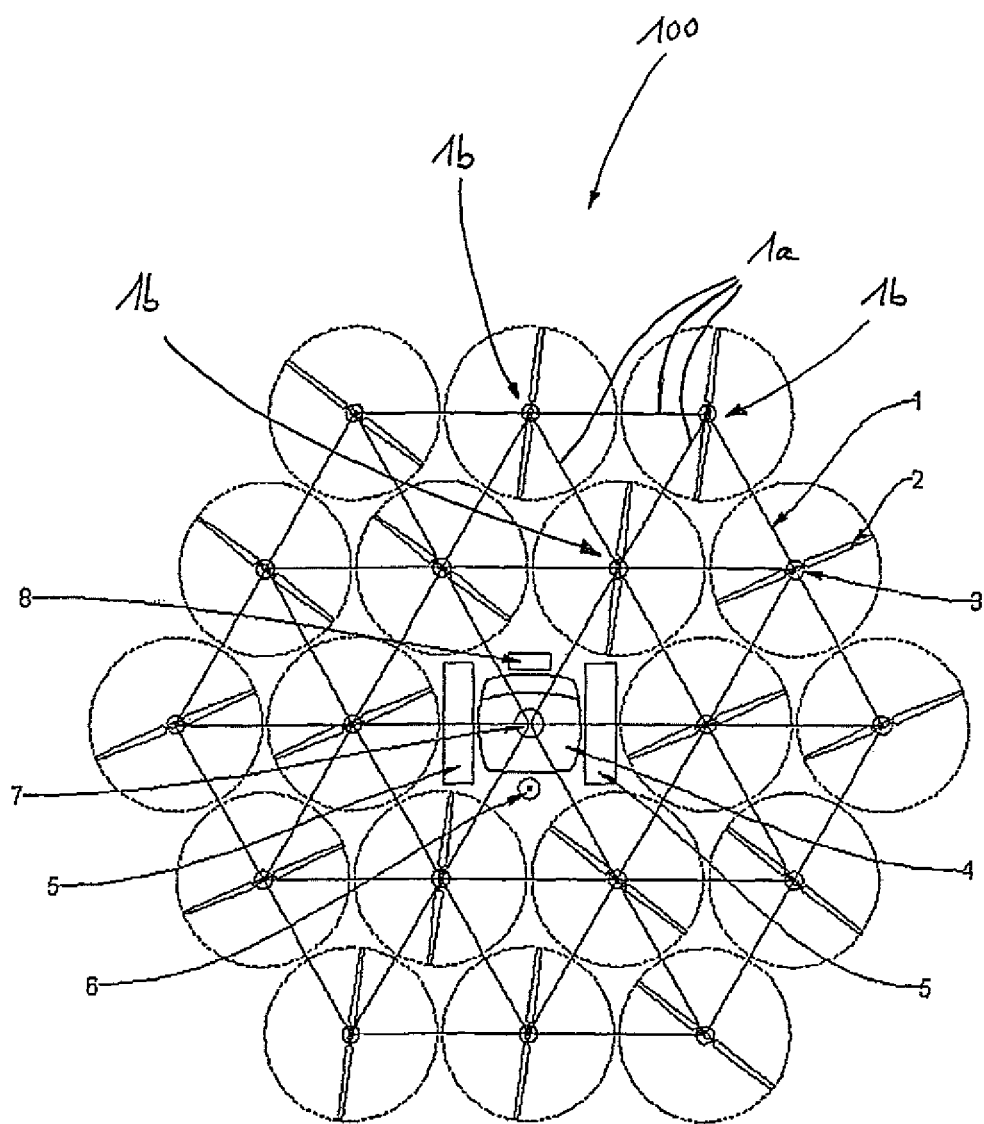
FIG. 1 shows a plan view of a first construction of the aircraft according to the invention.

FIG. 1 shows a first embodiment of the aircraft according to the invention in plan view. The aircraft is designated as a whole with the reference symbol 100 and comprises initially an overall hexagonal framework supporting structure or, for short, frame structure 1 that is formed from a number of tension-resistant and compression-resistant bars 1a, of which only some of these bars are shown explicitly in FIG. 1 for reasons of clarity. The bars 1a form essentially triangular "unit cells" of an overall hexagonal (six-sided) arrangement and are linked to each other at nodes 1b, so that a three-dimensional space framework in the form of a three-dimensional lattice construction is produced, as can be seen especially from the front view according to FIG. 2. The bars 1a can each be constructed in a suitable material that has sufficient strength and stability and simultaneously low self-weight, for example, using (light) metals, plastics, wood, or a hybrid/composite material.

Figure 2:
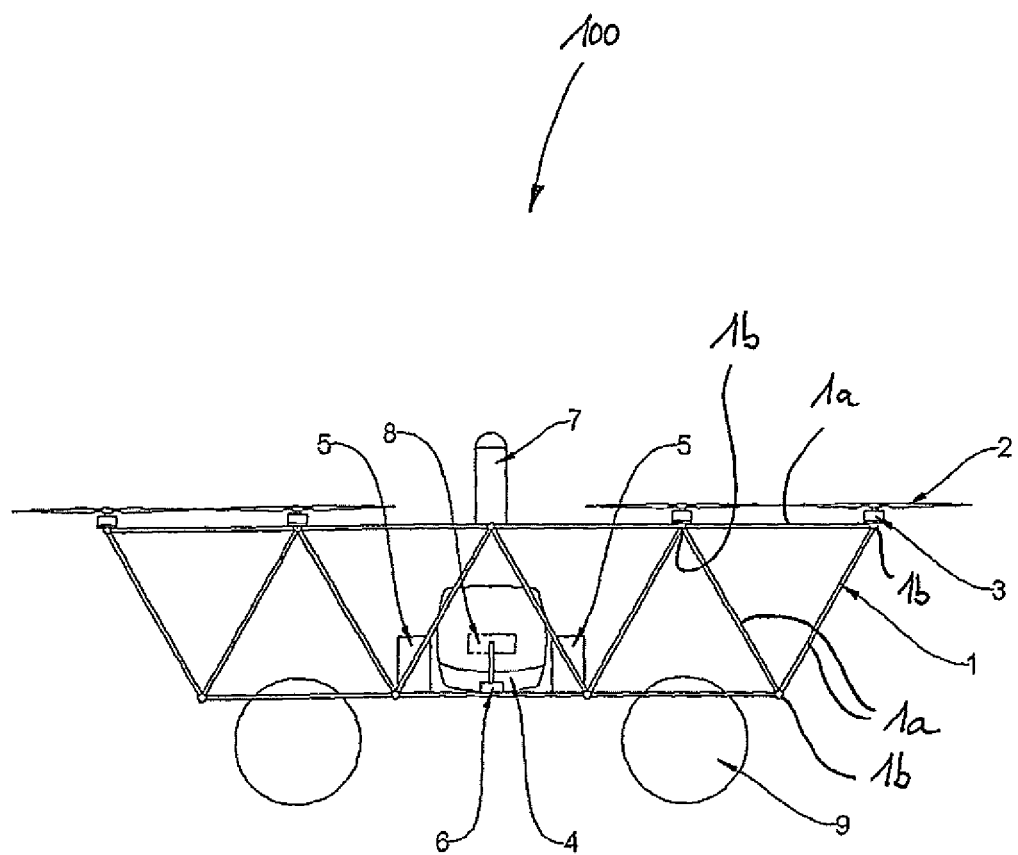
FIG. 2 shows a front view of the aircraft from FIG. 1.

As is further produced from FIG. 1 and FIG. 2, at the upper nodes 1b of the frame structure 1 in a common plane, a number of propellers 2, in total 18, are arranged that are each coupled without gears to an associated electric motor 3 and are driven by this motor directly. According to the illustration in FIG. 1, the propellers 2 are arranged at the nodes 1b of the frame structure 1 or the space framework such that a hexagonal area fill is produced, wherein the position remains propeller-free in the center of the arrangement (at reference symbol 7) intentionally, which will be discussed in more detail below.

As dashed-line circles, in FIG. 1, the rotor circular areas of the propellers 2 are also shown, that is, those areas that are covered by the rotating propellers 2. As can be seen from the illustration in FIG. 1, in the construction of the aircraft 100 according to the invention shown there, the propellers 2 do not overlap with their rotor circular areas, but without limiting the present invention to such an arrangement. Through suitable selection of the length of the bars 1a or the propeller diameter, arrangements can also be achieved in which the propellers 2 overlap with their rotor circular areas, so that they would be arranged accordingly at different planes.

Through the already discussed construction of the frame as a space framework or three-dimensional lattice construction, a high specific strength is achieved. The introduction of forces, especially the weight and thrust forces of the propellers 2 and motors 3, takes place at the nodes 1b of the space framework. Therefore the bars 1a or beams are loaded only with compression and tension, but not with bending or torsion moments. Through this arrangement and the use of lightweight components or materials for the frame structure 1, the propellers 2, the motors 3, and other components of the aircraft 100, the total weight is kept as low as possible.

In FIGS. 1 and 2, reference symbol 4 represents a pilot seat that can be suspended, for example, by means of an elastic harness in the frame structure 1, which is not shown in more detail in the figures for reasons of clarity. Advantageously, the pilot seat 4 is suspended at the nodes 1b of the frame structure 1. The elastic suspension of the pilot seat 4 makes it possible to absorb stronger shocks.

Furthermore, in the frame structure 1, electrical energy accumulators in the form of batteries or the like are arranged at reference symbol 5. In the present embodiment, two such energy accumulators (batteries) 5 are provided in order to distribute the total weight better and to guarantee a certain degree of redundancy in the energy supply. The energy accumulators 5 are connected to the electric motors 3 and are used to supply them with electrical energy. Here it is essential that the energy accumulators 5 have the highest possible electrical energy density. In addition to the already mentioned batteries, for this purpose, supercapacitors or fuel cells could also be used, also in arbitrary combination. To achieve longer flight times, an internal combustion engine with a generator or another energy convertor could optionally be provided as a so-called range extender that recharges the energy accumulators 5 during the flight. Such a range extender is not shown in FIGS. 1 and 2; it will be discussed in more detail below.

In FIGS. 1 and 2, reference symbol 6 designates a control stick like a kind of joystick that is used to transfer control commands and attitude settings of a pilot (not shown) located in the seat 4 to attitude control and system control electronics that are in active connection, on their side, with signals and controllers to the electric motors 3, in order to influence the flight behavior of the aircraft 100 overall by means of the rotational speeds of the corresponding motors. The mentioned electronics are shown in FIGS. 1 and 2 with reference symbol 8 and can be arranged, in particular, in the vicinity of the pilot seat 4 (in the present case behind the pilot seat 4).

In FIGS. 1 and 2, reference symbol 7 designates an emergency parachute for the whole aircraft 100 including the pilot and cargo, in the present case in its folded together and packed state. The emergency parachute 7 is arranged in the propeller-free central area of the frame structure 1, which has already been mentioned, so that it can unfold freely toward the top. Alternatively, several (small) parachutes could be provided that together form a so-called whole aircraft emergency system. The parachute 7 is preferably arranged, deviating from FIGS. 1 and 2, underneath a plane defined by the propellers 2, so that possibly flung-off, broken parts of propellers (e.g., if a bird is hit) do not damage the parachute if possible.

Reference symbol 9 (cf. FIG. 2) designates the landing gear of the aircraft 100, which is constructed according to the embodiments shown in FIGS. 1 and 2 in the form of air-filled balls that are used, on one hand, as cushioning and, on the other hand, act like floats in the event that the aircraft 100 makes a landing on water, in order to prevent the aircraft 100 from sinking.

Figure 3:
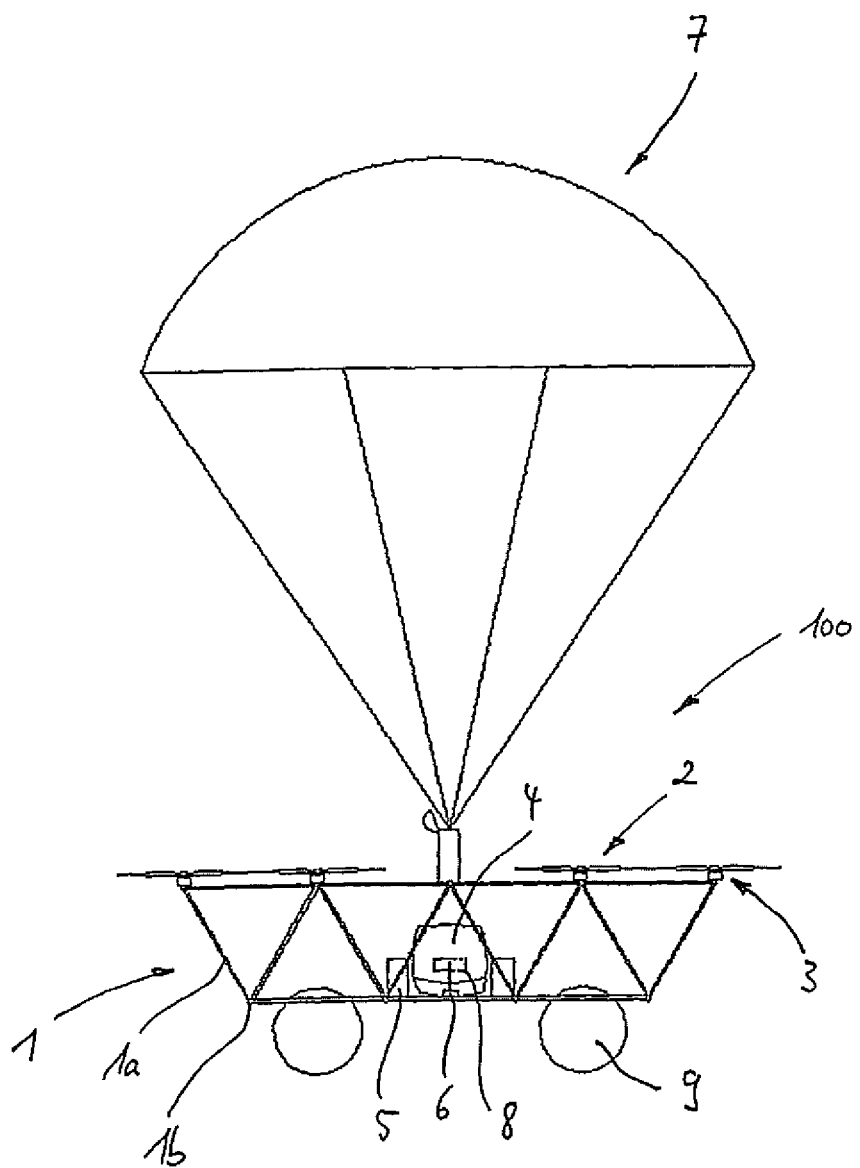
FIG. 3 shows the aircraft according to FIG. 2 with opened emergency parachute.

FIG. 3 shows the aircraft 100 according to FIGS. 1 and 2 with opened emergency parachute 7, in order to safely guide the aircraft 100 to the ground, in particular, in the event that an excessively large number of electric motors 3 fail or in the event of other disruptions. Otherwise, the reference symbols in FIG. 3 correspond to those in FIGS. 1 and 2.

Figure 4:
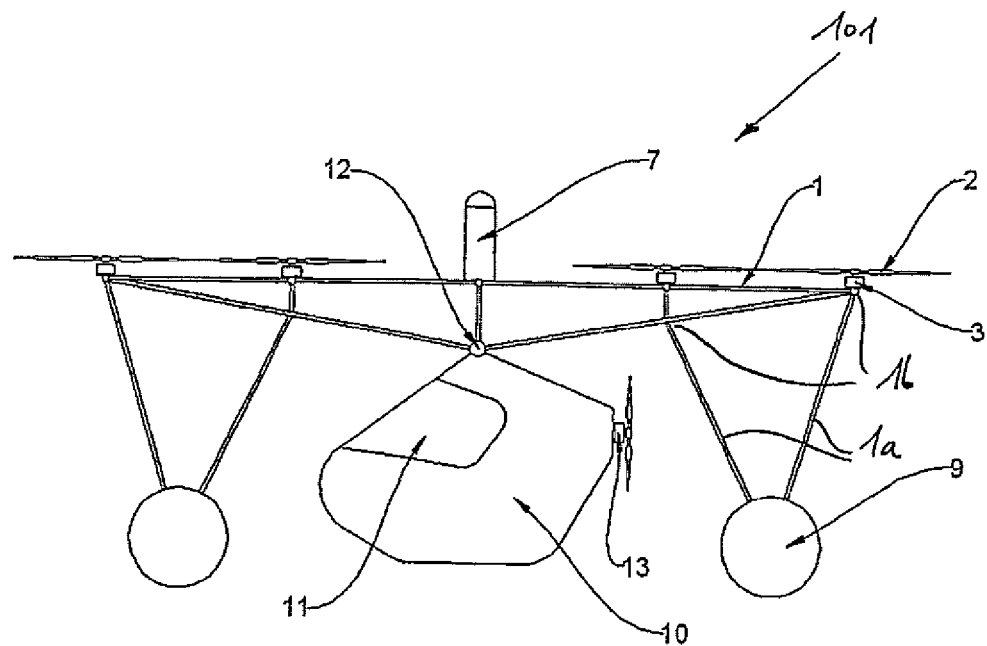
FIG. 4 shows a side view of a second construction of the aircraft according to the invention with a cockpit.
Figure 5:
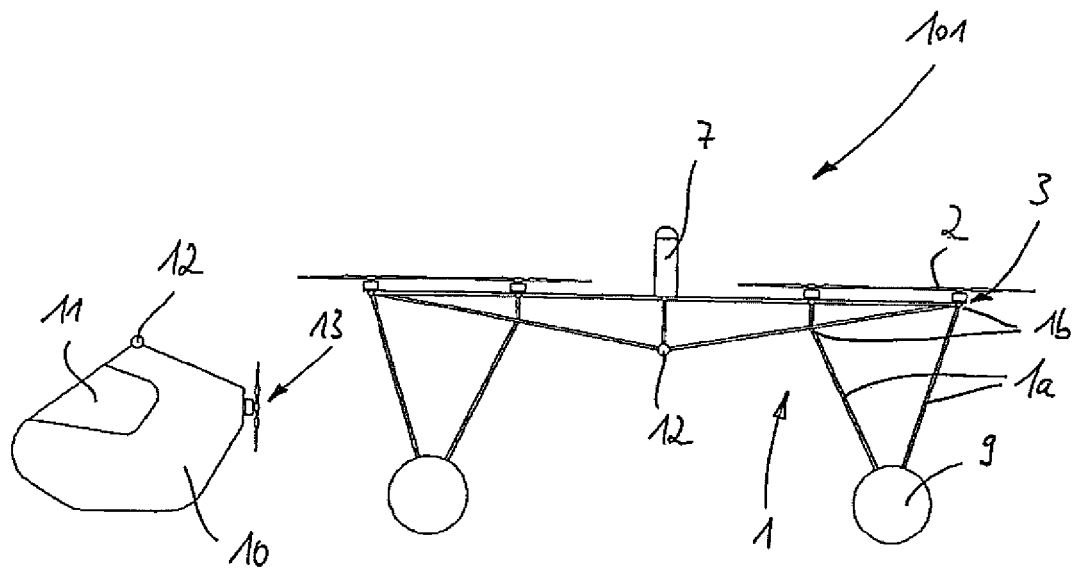
FIG. 5 shows the aircraft from FIG. 4 with decoupled cockpit.

In FIGS. 4 and 5, an alternative construction of the aircraft according to the invention is shown, which is designated in its entirety with the reference symbol 101. Otherwise, identical reference symbols correspond, in turn, to identical elements or to elements with identical actions.

According to FIGS. 4 and 5, the frame structure 1 is formed, in turn, from bars 1a that are linked to each other at nodes 1b, but has an overall geometry deviating from that in FIGS. 1-3. Instead of the "open" pilot seat 4 according to FIGS. 1-3, the construction according to FIGS. 4 and 5 has a closed pilot's cabin or cockpit 10 that has a front panel that allows the pilot (not shown) to see outside. The cockpit or cabin 10 is suspended with articulation on the frame structure 1 at reference symbol 12. Advantageously, the joint 12 is constructed as a pivot joint, so that the cockpit or cabin 10 can pivot about the pitch axis of the aircraft 101 oriented perpendicular to the plane of the paper in FIGS. 4 and 5. As shown in FIG. 5, the cockpit or cabin 10 can be separated from the frame structure 1 in the area of the joint 12, so that it can also move, in particular, autonomously. For this purpose, the cockpit or cabin 10 has its own (supplemental) drive device in the form of a thrust propeller 13 with corresponding motor (advantageously also electrically driven), wherein this drive device is arranged in the present case in the rear area of the cockpit or cabin 10. Nevertheless, the invention is limited in no way to such an arrangement of the supplemental drive device, which could also be constructed alternatively in the form of a traction propeller in the front area of the cockpit or cabin 10.

For control purposes, the drive device or the thrust propeller 13 is constructed so that it can pivot relative to the cockpit or cabin 10 or is provided with a yaw rudder (not shown). The cockpit or cabin 10 itself advantageously has a buoyant construction and can move forward, after decoupling from the rest of the aircraft 101 or the frame structure 1 according to FIG. 5, autonomously, in particular, also in water. If the cockpit or cabin 10 is equipped alternatively or additionally with running gear or wheels, skids, or the like (not shown here), forward motion on land (flat ground, street, ice, snow, etc.) is also possible.

The components also shown in FIGS. 1-3 with reference symbols 4, 5, 6, and 8 for the aircraft 100 according to the invention are located within the cockpit or cabin 10 in the embodiment 101 according to FIGS. 4 and 5 and are therefore not shown separately.

Figure 6:
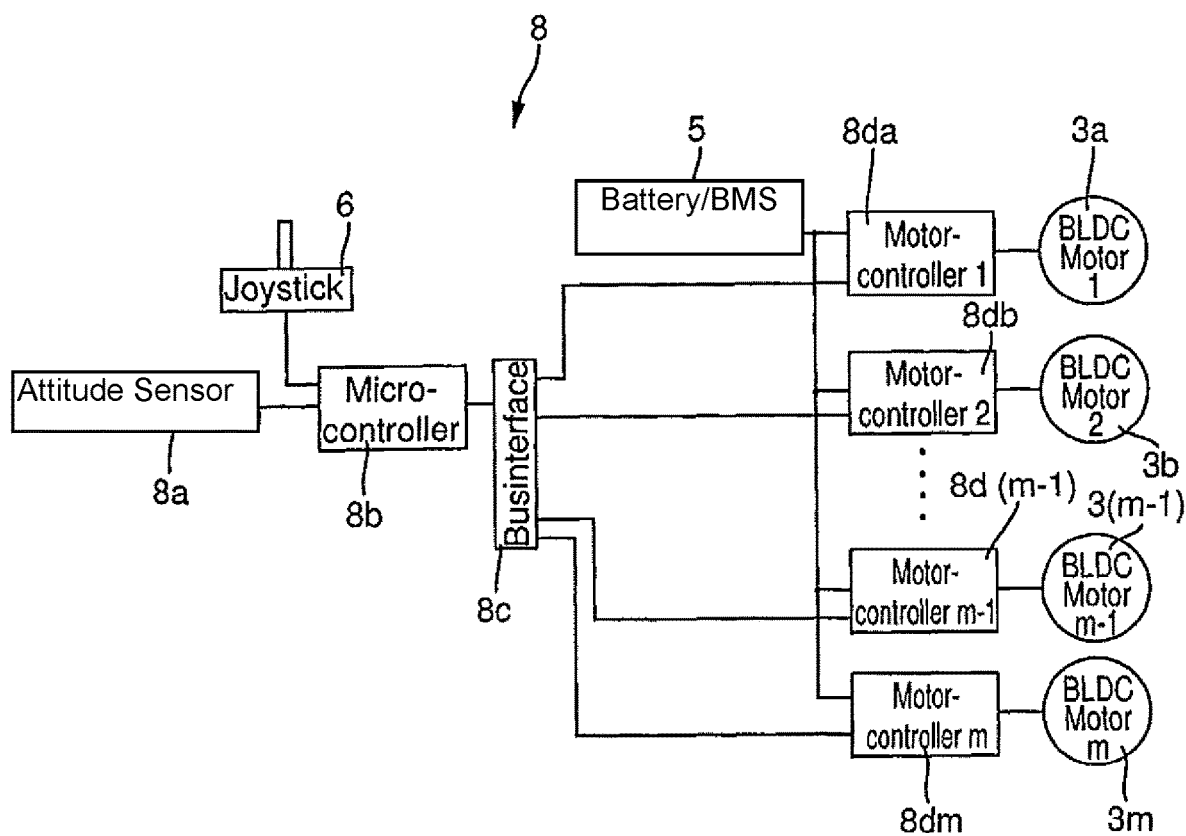
FIG. 6 shows the block circuit diagram of an electronic arrangement for attitude control and motor control or power supply in an aircraft according to the invention.
Figure 7:
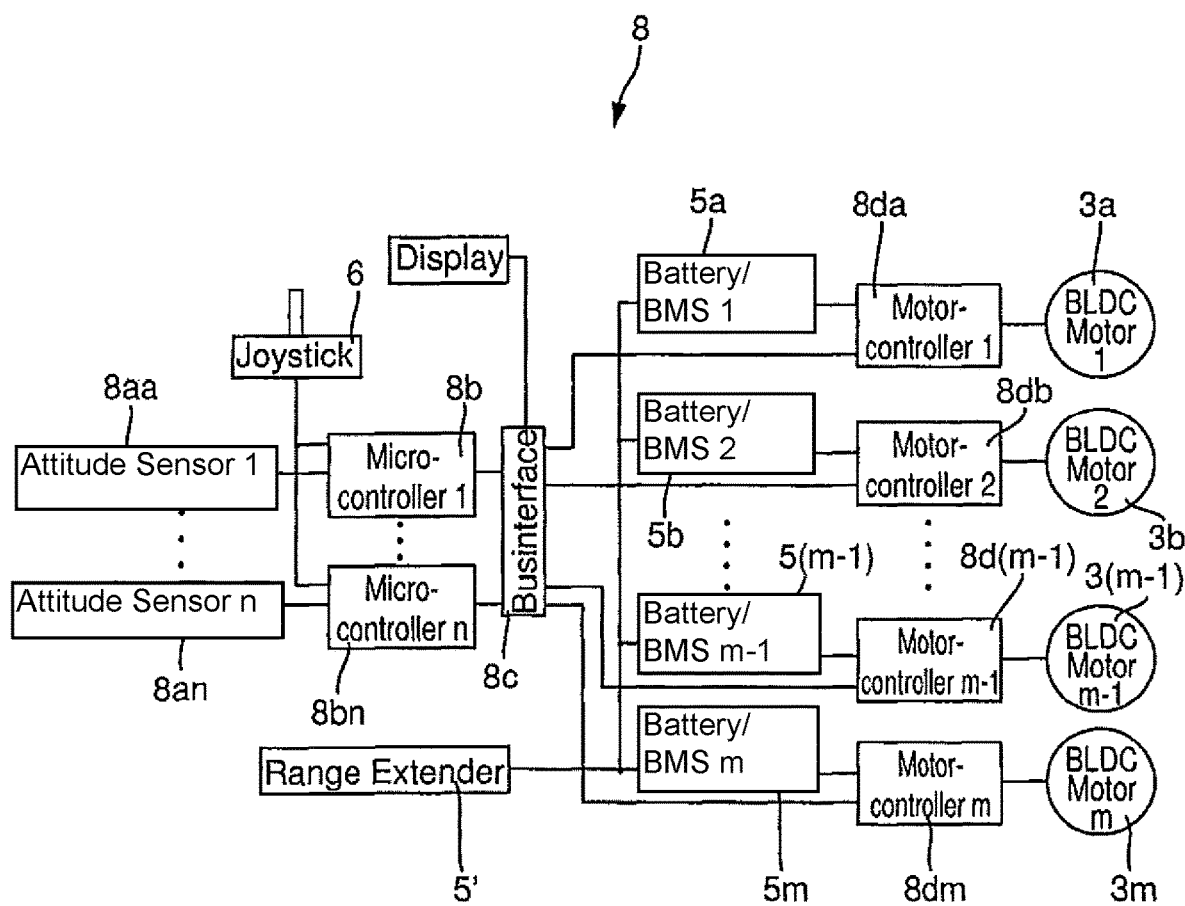
FIG. 7 shows the block circuit diagram of an alternative electronic arrangement for attitude control and motor control or power supply in an aircraft according to the invention.

FIGS. 6 and 7 show possible constructions for electronic arrangements (electronics) for attitude control and system control of the aircraft 100 or 101. In FIGS. 6 and 7, the mentioned electronics arrangements are designated with the reference symbol 8 that basically corresponds to the already mentioned reference symbol 8 according to FIGS. 1-3, in particular, with reference to the arrangement of the relevant electronics within the aircraft 100 or 101.

According to the block diagram in FIG. 6, the attitude control/control electronics 8 initially comprises an attitude sensor 8a, wherein this attitude sensor 8a is constructed to continuously detect, using measurement technology, the attitude and orientation of the aircraft in space with respect to the three translational and the three rotational degrees of freedom. According to the alternative construction in FIG. 7, the mentioned attitude sensors have a redundant design and comprise first to n-th attitude sensors 8aa to 8an. The attitude sensor 8a or the attitude sensors 8aa-n is or are in active signal connection with a signal processing unit, in the present example and without limitation to a microcontroller 8b or 8ba-8bn. The microcontroller 8b or microcontrollers 8ba-n is or are signal connected via a bus interface 8c to motor control units (motor controllers) 8da-8dm in the form of a rotary encoder, wherein each motor controller 8da-m is allocated to one of a total of m brushless electric motors 3a-3m, in order to control the latter especially for adjusting the engine speed.

According to the construction in FIG. 6, an individual, central energy accumulator 5 with battery management system BMS is provided, wherein this energy accumulator 5 is connected using control technology to all of the motor controllers 8da-m, in order to provide these or the associated electric motors 3a-m with electrical energy. In contrast, in the construction according to FIG. 7, there are several energy accumulators 5a-5m, wherein a separate energy accumulator 5a-m is allocated to each motor controller 8da-m. Furthermore, for the construction according to FIG. 7, a range extender 5' is provided, which was already discussed above. This is connected using control technology to the energy accumulators 5a-m and ensures that these always have a sufficient state of fill during the flight. The range extender 5' can be constructed, in particular, as an internal combustion engine with generator, as a fuel cell arrangement, or in some other way.

As someone skilled in the art can easily see, elements of the electronics arrangement 8 according to FIG. 6 and FIG. 7 can be combined virtually arbitrarily. For example, the range extender 5' according to FIG. 7 can also be used in the construction according to FIG. 6, in order to charge the energy accumulators 5 in that construction. In addition, it is within the scope of the present invention to provide a plurality of energy accumulators 5, wherein this plurality does not have to correspond to the number of motor controllers being used. For example, it is possible that each energy accumulator provides two, three, or k motor controllers, where k≤m. This equation applies analogously to the number of attitude sensors and/or microcontrollers. The range extender 5' according to FIG. 7 can also have a redundant design.

The constructions in FIGS. 6 and 7 have in common that the control stick or joystick 6 already mentioned above is connected to the microcontroller 8a or microcontrollers 8ba-n. By means of the control stick or joystick 6, it is possible for the pilot to send attitude control or system control specifications advantageously in digital, electrical form to the microcontroller 8b or microcontrollers 8ba-n, wherein these specifications are used together with the measurement data of the attitude sensor 8a or the attitude sensors 8aa-n for attitude control and for controlling the aircraft. If there are several microcontrollers 8ba-n, these can monitor each other to increase flight safety. From the data delivered by the attitude sensors 8a or 8aa-n and evaluated by the microcontrollers 8b or 8ba-n for the attitude, velocity, and acceleration of the aircraft in three-dimensional space, the control information for the electric motors 3a-m or the associated motor controllers 8a-m are calculated, so that steady hovering is possible with the aircraft according to the invention even under external interference forces, such as gusts of wind and turbulence.

The control is performed—as already mentioned—through electronic control of each individual electric motor 3a-m. Here, several motors 3a-m can be assembled into groups. This is to be understood, in modification to FIGS. 6 and 7, to the extent that a motor controller is then allocated to several motors, in order to control these with respect to their rotational speed.

Figure 8:
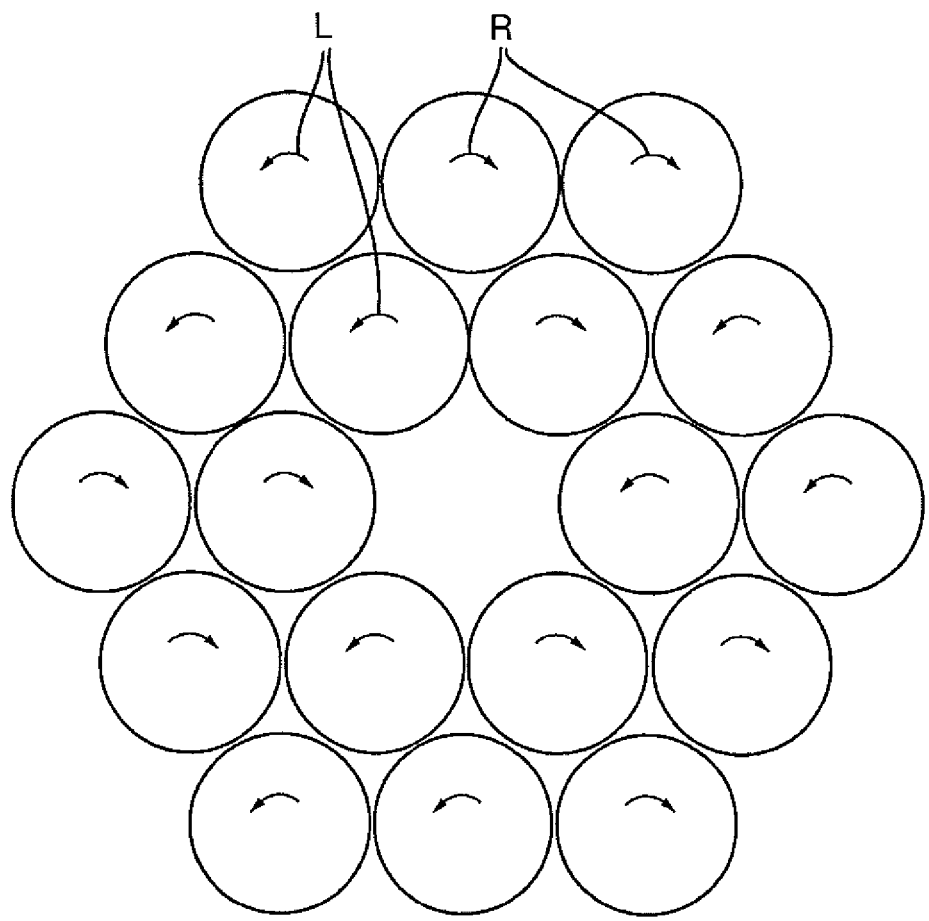
FIG. 8 shows schematically the rotational directions of the individual propellers in an aircraft according to the invention.

Advantageously there is the same number of counterclockwise rotating and clockwise rotating propellers and/or motors, in order to equalize the angular momentum and to prevent rotation of the aircraft as a whole. This is shown in FIG. 8 using an example, wherein only the circular areas covered by the propellers or their circumferences are shown (cf. FIG. 1). Arrows R designate clockwise rotating propellers, while arrows L designate counterclockwise rotating propellers. For reasons of clarity, not all arrows are designated explicitly in FIG. 8. The already discussed equalization of angular momentum implies that an even number of propellers should always be provided. The actual illustration in FIG. 8 shows a useful distribution of the rotational directions, wherein if possible, opposing propellers have opposite rotational directions R, L.

The aircraft 100, 101 is raised or lowered by simply increasing or decreasing the rotational speeds of all motors 3 or 3a-m. Pitch and roll movements are controlled by increasing the rotational speeds of multiple motors 3, 3a-m on one side of the aircraft, while the motor rotational speeds are reduced accordingly on the opposite side (front/rear or right/left). The total thrust remains unchanged. Yaw movement is controlled by increasing the rotational speed in all motors 3, 3a-m of one rotational direction R, L, while decreasing the rotational speed in the other rotational direction. The total thrust also remains unchanged here. To increase the response of the aircraft 100, 101 in the direction of the yaw movement, some propellers 2 and motors 3, 3a-m are inclined by a small angle relative to the horizontal, wherein the horizontal corresponds to the plane mentioned above with reference to FIG. 1. This is shown clearly in FIG. 10.

Figure 10:
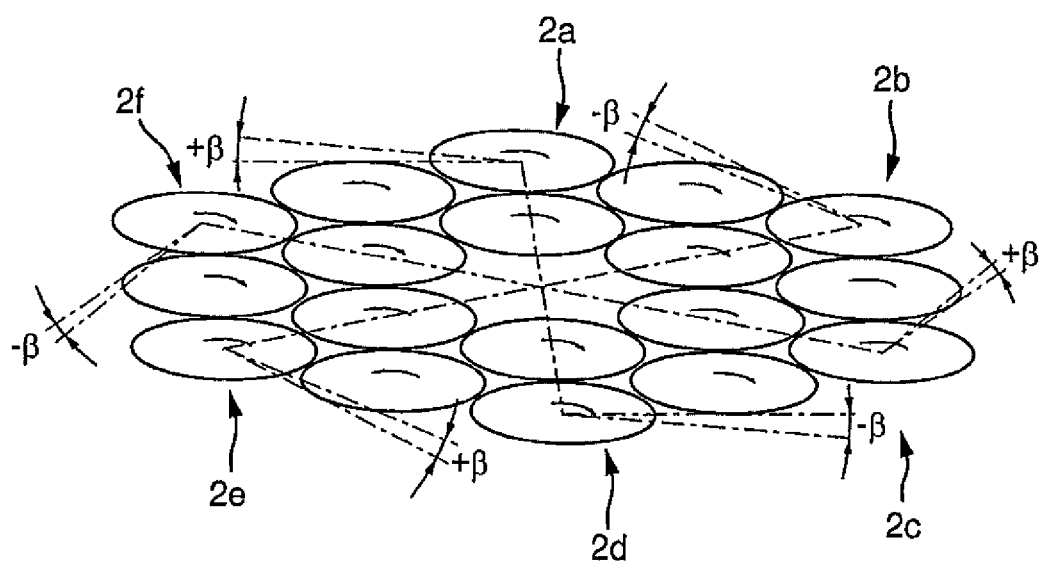
FIG. 10 shows schematically the relative angular position of the propeller in an aircraft according to the invention.

FIG. 10 shows the propeller arrangement according to FIG. 1 or FIG. 8 in which six propellers are inclined relative to the mentioned horizontal plane. These propellers are designated in FIG. 10 explicitly with reference symbols 2a-2f. Shown are, in turn, only the circumferences of the covered rotor circular areas. According to the illustration in FIG. 10, the inclined propellers 2a-f are on the outer corners of the hexagonal arrangement and thus have the greatest possible lever arm about the height axis of the aircraft 100, 101. For propellers rotating counterclockwise in the plan view—according to FIG. 10 these are the propellers 2a, 2c, and 2f—the specified tilt or inclination angle beta (β) is positive (+beta), for clockwise rotating propellers the angle beta is negative (−beta). The magnitude of the tilt or inclination angle is between approximately 1° and 5° according to the desired response behavior. The inclination direction is selected so that the yaw movement of the aircraft is supported in the same sense relative to the running direction of the propeller.

Figure 9:
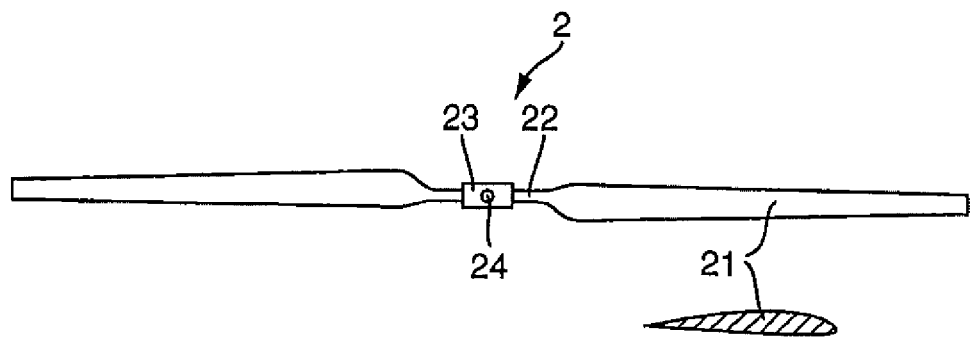
FIG. 9 shows a plan view and a cross section of a propeller for an aircraft according to the invention.

In FIG. 9, two views of a possible construction of the propellers 2 or 2a-f are shown, namely a plan view and a smaller cross-sectional view of a propeller or rotor blade 21. In addition to the already discussed rotor blades 21, the propeller or rotor 2 has a hub 23, wherein the rotor blades 21 are connected to the hub 23 by means of so-called blade roots 22. With reference symbol 24, an opening 24 for the motor shaft (not shown) is also shown. The propellers or rotors 2 preferably used in the scope of the present invention have—in contrast to typical airplane propellers—a very low pitch/diameter ratio of, for example, 0.3, in order to make the rotor circular area as large as possible, but simultaneously keeping the torque and thus the required drive output as low as possible.

The typical flapping and oscillating movements that occur during fast forward flight in conventional helicopters also occur in the aircraft presented here due to the different lifting forces on the leading and returning rotor blades 21. These forces can be absorbed because the blade roots 22 of the propellers or rotors 2 are constructed with elastic properties. For this purpose, the rotor blades 21 and the blade roots 22 can be made from a fiber composite material, advantageously from plastic reinforced with carbon fiber (CFK). The hub 23 is here constructed advantageously in aluminum or a comparable material and the blade roots 22 are mounted in the hub 23 that is centered, on its side, by the motor shaft (at reference symbol 24). To set the elasticity in the area of the blade roots in a selective way, only unidirectional fibers are used there, where these fibers are staggered, that is, extend into the rotor blade 21 with different lengths. A fabric is advantageously used on the rotor blade 21 itself as a covering layer.

The absorption of the flapping and oscillating forces can be alternatively achieved also through a sufficiently robust, stiff design of the rotor blades and the motor shaft. The rotor blades then have as little elasticity as possible, that is, have an inelastic (stiff) and sufficiently robust construction.

In conventional helicopters, advantageously symmetric rotor blade profiles are used that do have a better pressure-point stability in the cyclic blade adjustment, but also have, compared with asymmetric profiles, the disadvantage of lower lift. In the aircraft 100, 101 that are proposed here and advantageously provide no possibility of blade adjustment, asymmetric rotor blade profiles with higher lift can be used. Such a blade profile is shown as an example at the bottom right in FIG. 9.

Figure 11:
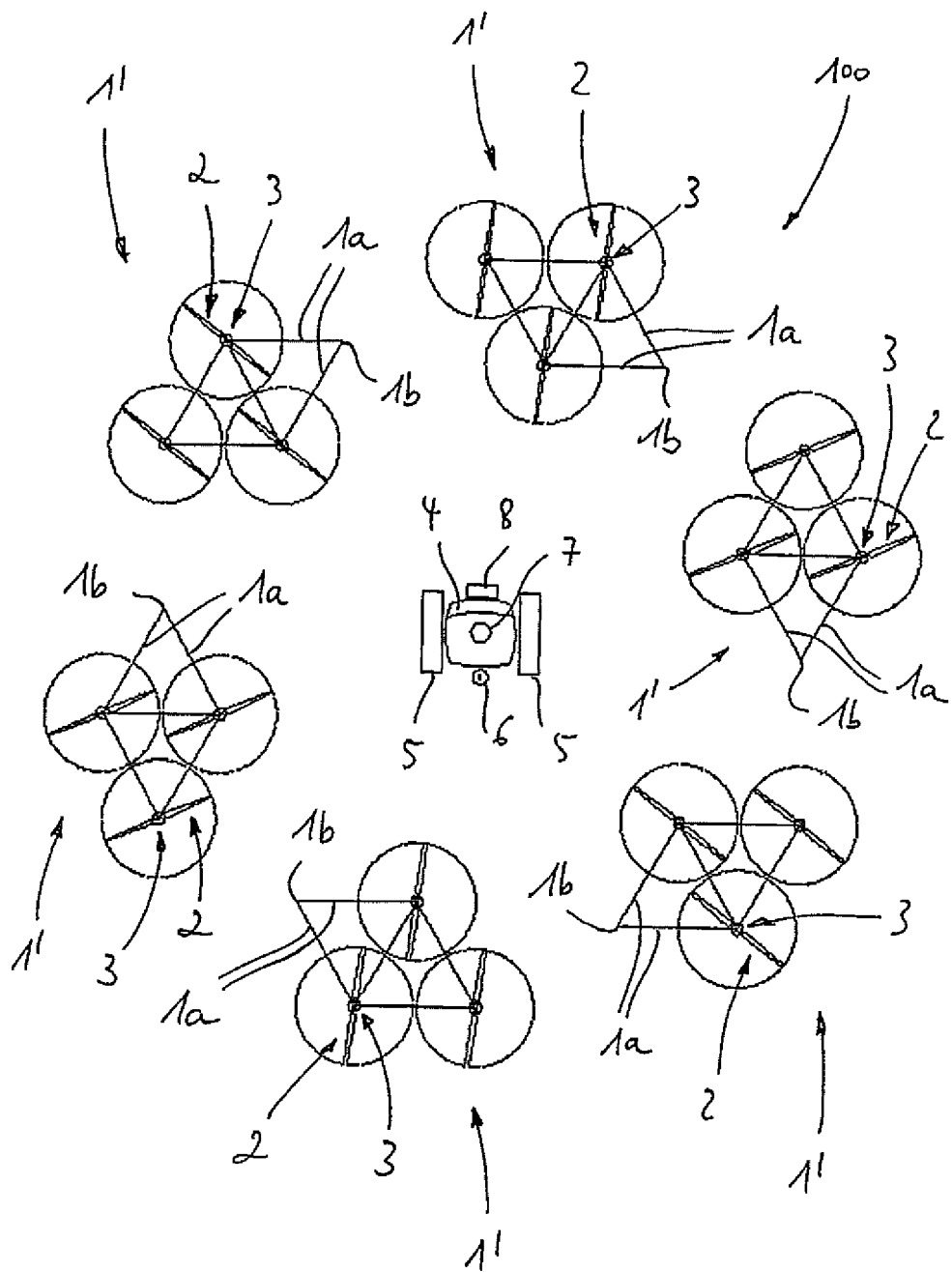
FIG. 11 shows schematically the modular construction of an aircraft according to the invention, especially the aircraft according to FIG. 1.

FIG. 11 shows schematically with reference to the aircraft 100 according to FIG. 1 and FIG. 2 its possible modular construction for the purpose of improving transportability.

As the schematic illustration in FIG. 11 shows, the frame structure 1 (FIG. 1) can be disassembled into a series of modules 1', wherein these modules each comprise three propellers or rotors 2 with the associated electric motors 3, and each in a flat, triangular arrangement. Here, the individual frame structure modules 1' are assembled, in turn, from bars 1a that are connected to each other at nodes 1b. For reasons of clarity, not all bars 1a or nodes 1b are explicitly designated in FIG. 11. The connection of the individual modules 1' to each other can be realized by bolts, screws, clamps, clips, latches, or other suitable means. Then the "central unit" made from pilot seat 4, energy accumulators 5, control stick 6, emergency parachute 7, and electronics arrangement 8 is connected to the assembled frame structure, in order to produce the whole aircraft 100.

An alternative solution provides that the individual modules 1' are not completely separable, but instead can tilt or fold one over the other, in order to create also a space-saving transportable option for the aircraft 100 in this way. For this purpose, corresponding hinge or joint devices must be provided at suitable module connecting points, as someone skilled in the art easily recognizes.

Figure 12:
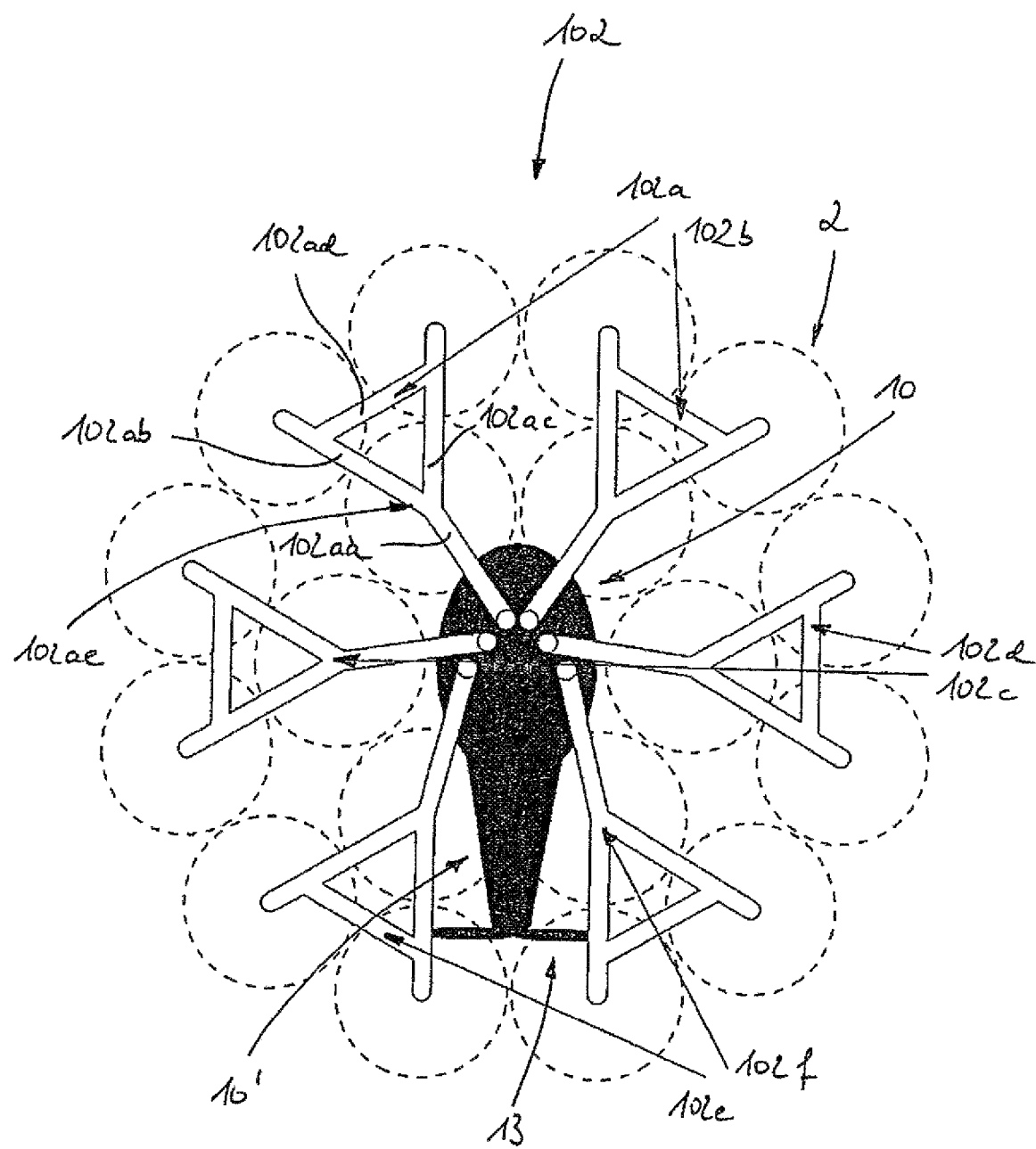
FIG. 12 shows schematically an alternative modular construction of another embodiment of the aircraft according to the invention in plan view, FIGS. 13a, b show the aircraft according to FIG. 12 in side view and in various states of flight.

FIGS. 12, 13a, 13b, and 14 show a different construction of the aircraft according to the invention that is here designated as a whole with the reference symbol 102. Analogous to aircraft 101 according to FIGS. 4 and 5, a cockpit or cabin 10 is present that is extended toward the rear like a fuselage in an area 10' and has, in the rear area, in turn, an additional drive device 13 in the form of a thrust propeller with corresponding motor arrangement (cf. FIGS. 4 and 5). The individual propellers or rotors 2 are symbolized, in turn, only by means of their rotor circular areas marked with dashed lines or their circumferences. These propellers or rotors, in threes, with the associated electric motors (not shown in FIGS. 12 to 14) are arranged on beams that go out like branches and are designated in the mentioned figures with the reference symbols 102a to 102f. As shown in FIG. 12 using an example with reference to the beam 102a, each beam consists of a first arm 102aa that is connected to the cockpit or cabin 10 and a second arm 102ab and a third arm 102ac that branch off from the first arm 102aa in the form of a Y-configuration. In the direction of the free ends of the second and third arms 102ab, 102ac, a connecting bar 102ad is arranged between these arms. The mentioned branching area of the second and third arms 102ab 102ac from the first arm 102aa is designated in FIG. 12 with the reference symbol 102ae. The electric motors (not shown) and propellers 2 are arranged on the free ends of the second and third arms 102ab, 102ac, and also in the branching area 102ae.

Figure 13A:
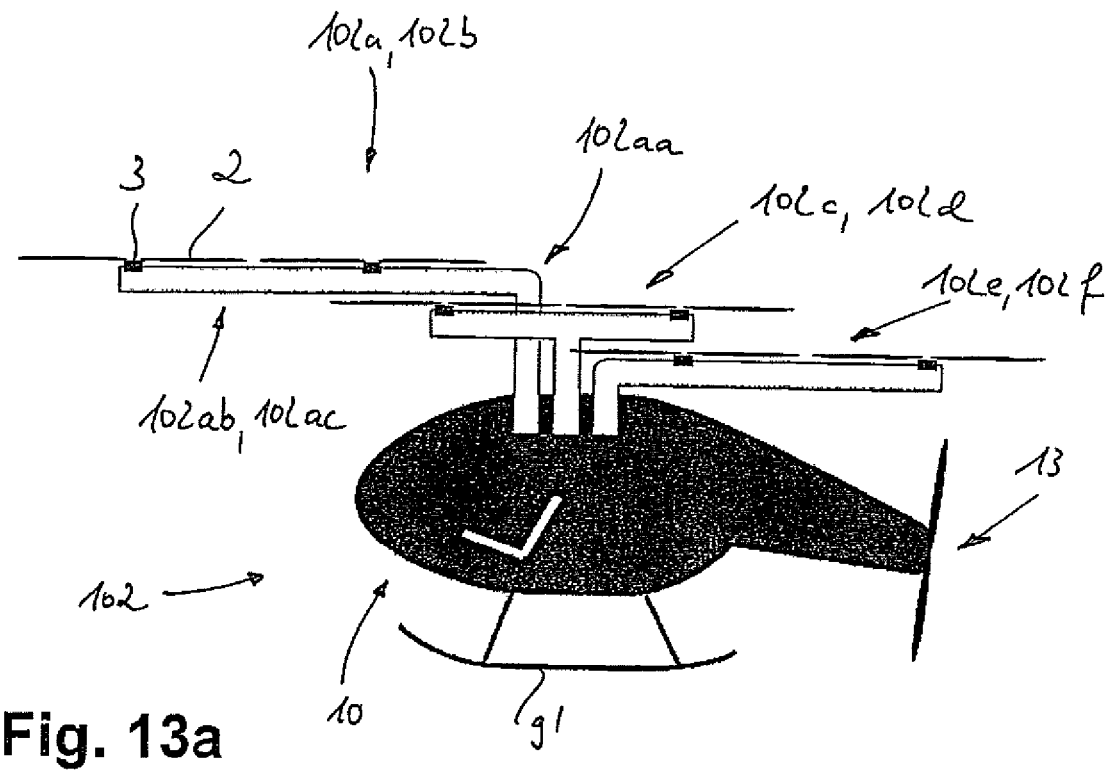
Figure 13B:
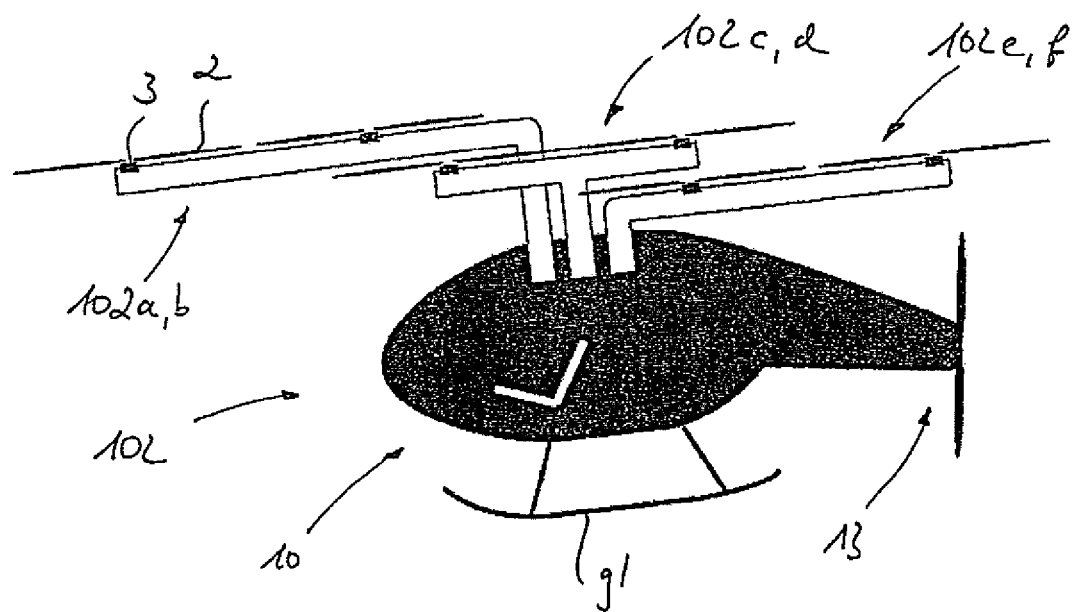

The mentioned first to third arms 102aa-c of the beams 102a-f are arranged essentially in a common plane, while the free end of the first arm 102aa is angled off according to the representation in FIGS. 13a and 13b by approximately 90° relative to this plane (toward the bottom), in order to connect the beams 102a-f to the rest of the aircraft 102. For reasons of clarity, this is shown explicitly in FIGS. 13a, 13b, in turn, only for select beams.

As can be seen in FIG. 13a and FIG. 13b, the mentioned bends of the first arms 102aa have different length dimensions, so that the propellers 2 of the beams 102a, 102b, the beams 102c, 102d, and the beams 102e and 102f are arranged staggered at different planes in the stationary hovering state of the aircraft 102 according to FIG. 13a. FIG. 13b shows the aircraft 102 according to FIG. 13a during forward flight. Due to the forward inclination of the aircraft 102, essentially two parallel rotor planes are effectively produced.

According to FIGS. 13a, b, the cockpit or cabin 10 is equipped on its bottom side with skids 9' which have already been discussed above.

Figure 14:
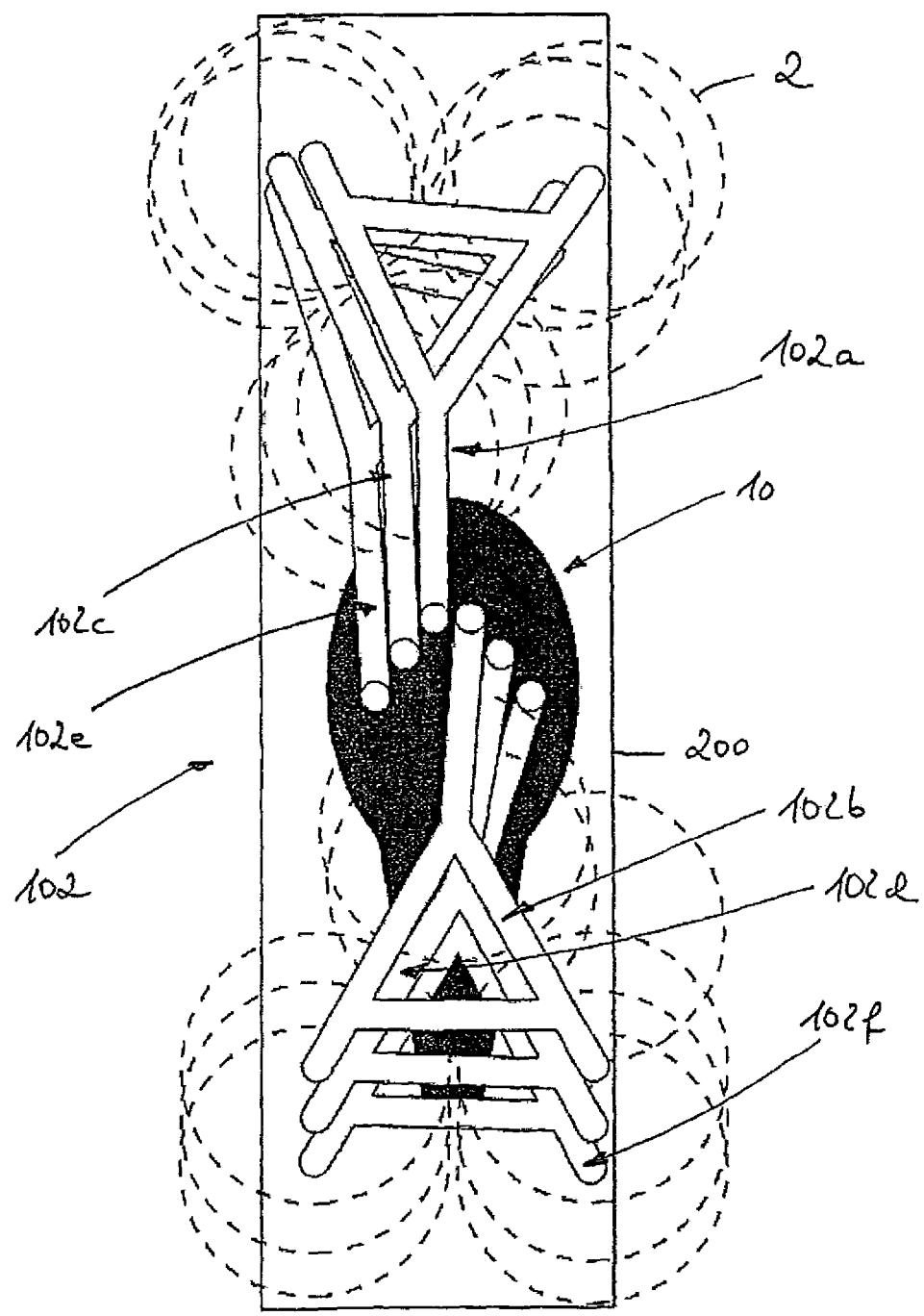
FIG. 14 shows the aircraft according to FIG. 12 and FIGS. 13a, b in its transport state.

FIG. 14 shows the aircraft 102 according to FIGS. 12, 13a, and 13b in the disassembled and assembled state on a transport device 200, like the loading surface of a trailer or truck. The individual beams 102a-f can be disassembled from the fuselage of the aircraft 102 or the cockpit or cabin 10. There is also the option, however, to pivot the beams 102a, c, e forward and one above the other about their connecting points to the cockpit or cabin 10, while the beams 102b, d, and f are pivoted backward one above the other accordingly. For this purpose, corresponding joint connections with the angled ends of the first beam arms 102aa must be provided on the cockpit or cabin 10.

FIGS. 15a-15j show another construction of the aircraft according to the invention that is here provided with the reference symbol 103. The aircraft 103 comprises, in turn, a pilot cockpit or pilot cabin 10 with skids 9' and additional drive device 13 (cf. FIGS. 13a, b) that is also combined with steering gear 13'. The propellers 2 together with the associated electric motors 3, which are not shown in their entirety for reasons of clarity, sit on Y-shaped beams 103a-103f going off like branches similar to the construction according to FIG. 12. Otherwise, the elements with the reference symbols 103aa-103ae correspond in terms of function to the elements with the reference symbols 102aa-102ad in FIG. 12.

One essential difference between the construction according to FIGS. 12, 13a, and 13b on one hand and the FIGS. 15a-15j on the other hand is the outward curved shape of the second and third beam arms 103ab, 103ac. In addition, in the construction according to FIGS. 15a-15j, all of the beams 103a-f are arranged in a common plane, which will be discussed in more detail below.

Deviating from FIG. 12, between the individual beams 103a-f there are additional connecting bars 103ad' that connect adjacent electric motors 3 (or their housings) of adjacent beams 103a-f to each other. This will be discussed in more detail with reference to FIG. 15b and FIG. 15c.

Figure 15A:
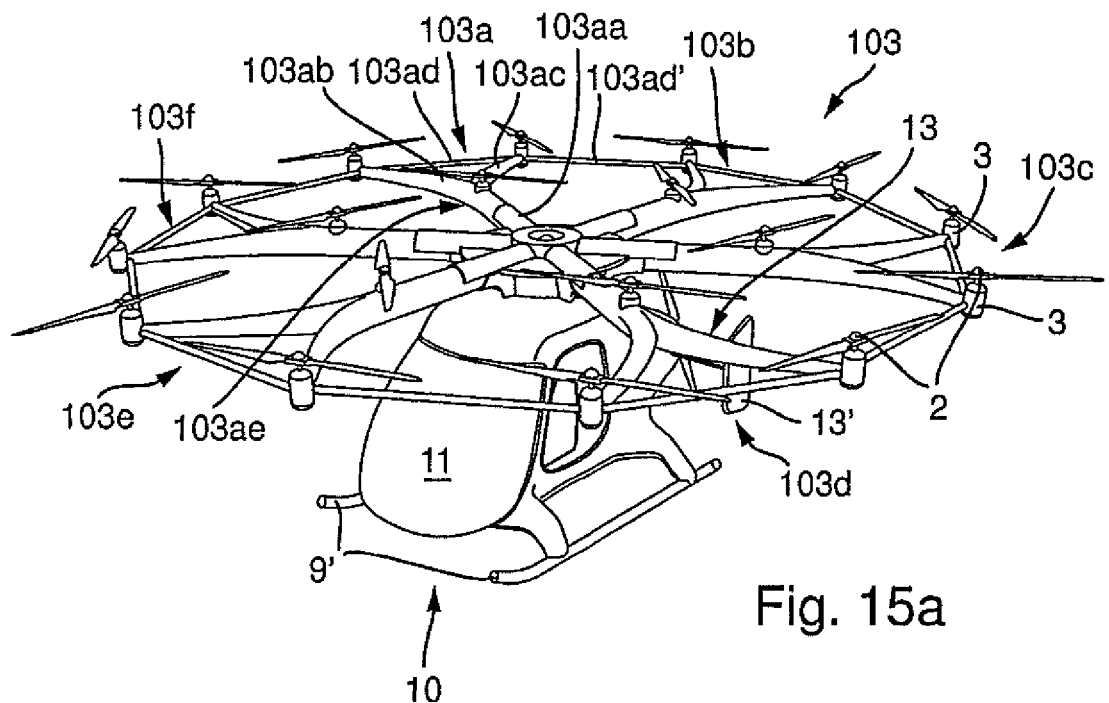
FIGS. 15a-j show the modular construction of another embodiment of the aircraft according to the invention in various states of assembly/disassembly.

Starting from FIG. 15a, now the following FIGS. 15b to 15j show different states of assembly/disassembly of the aircraft 103. For reasons of clarity, in this context in FIGS. 15b-j not all of the elements of the aircraft 103 are designated explicitly, but the designation is limited to those elements that have special effect or function in the corresponding state of assembly/disassembly.

Figure 15B:
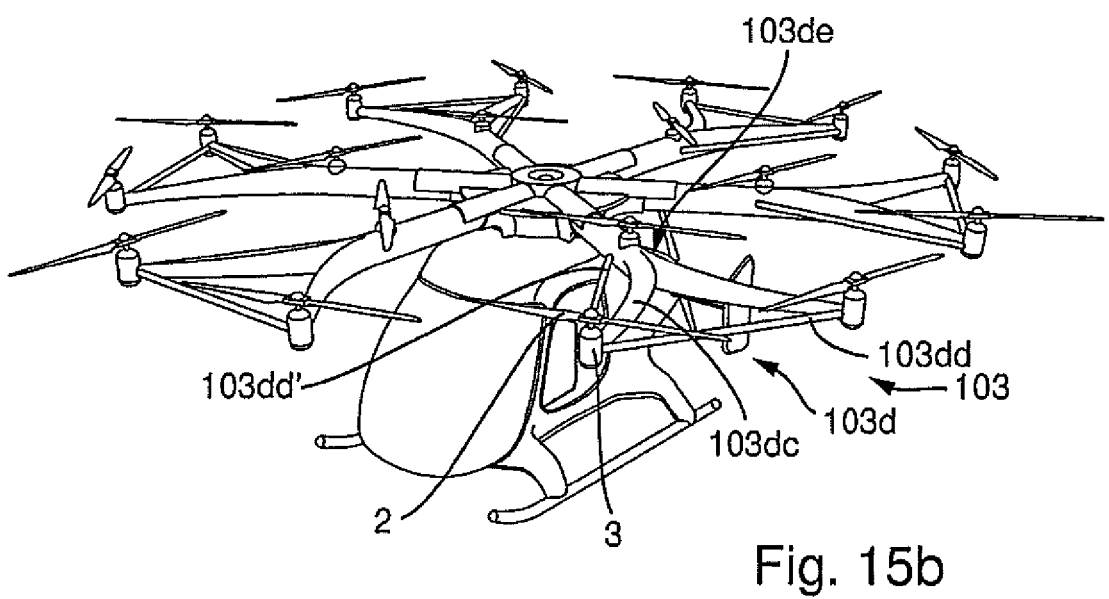

In FIG. 15b, as an example for the connecting bar 103dd' it is shown that the intermediate connecting bars of the individual beams are connected so that they can pivot with the third arm 103dc of the beam 103d. Here, the connecting bar 103dd' is hinged on the free end of the third arm 103dc, where also the relevant motor 3 with propeller 2 is arranged. The connecting bar 103dd' can be mounted in the area of the branch 103de on the beam 103d for disassembly of the aircraft 103.

Figure 15C:
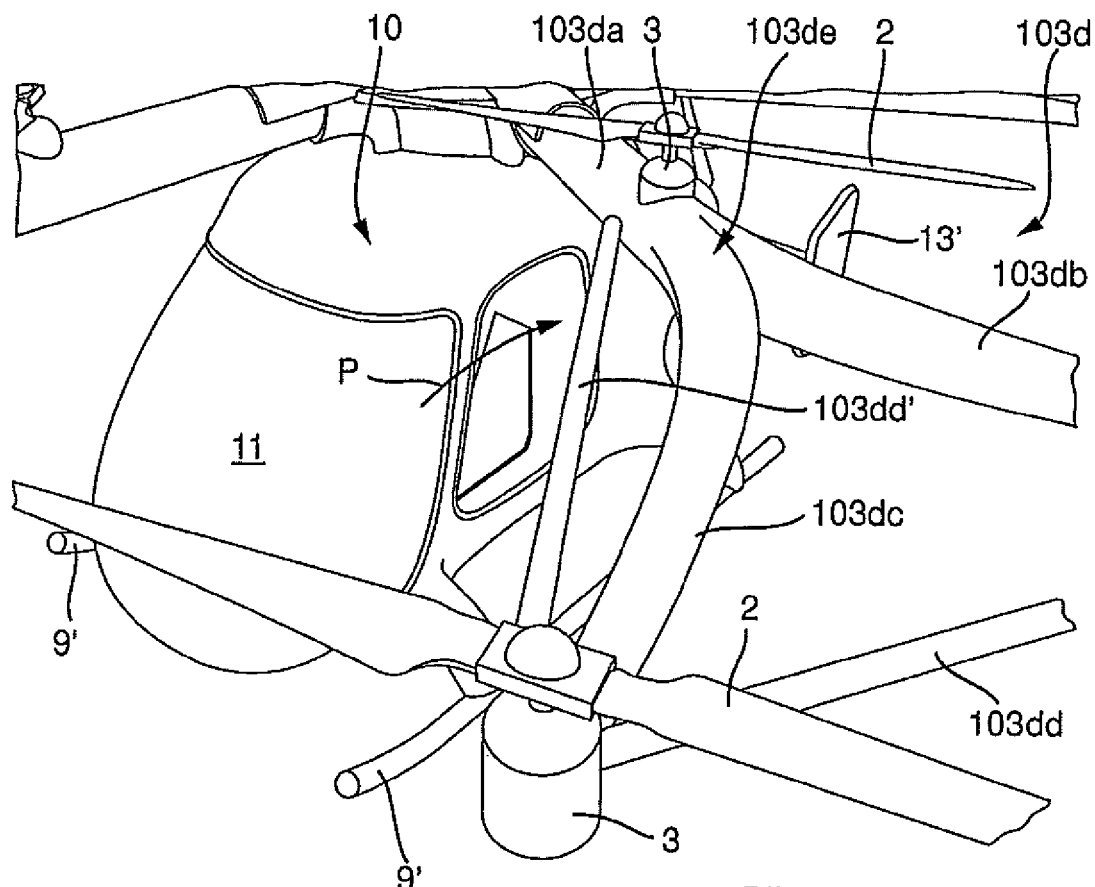

FIG. 15c shows the previously described matter with reference to a detailed representation. The figure shows in detail the connecting bar 103dd' that was mounted on the rest of the beam 103d by pivoting in the direction of the arrow P.

Figure 15D:
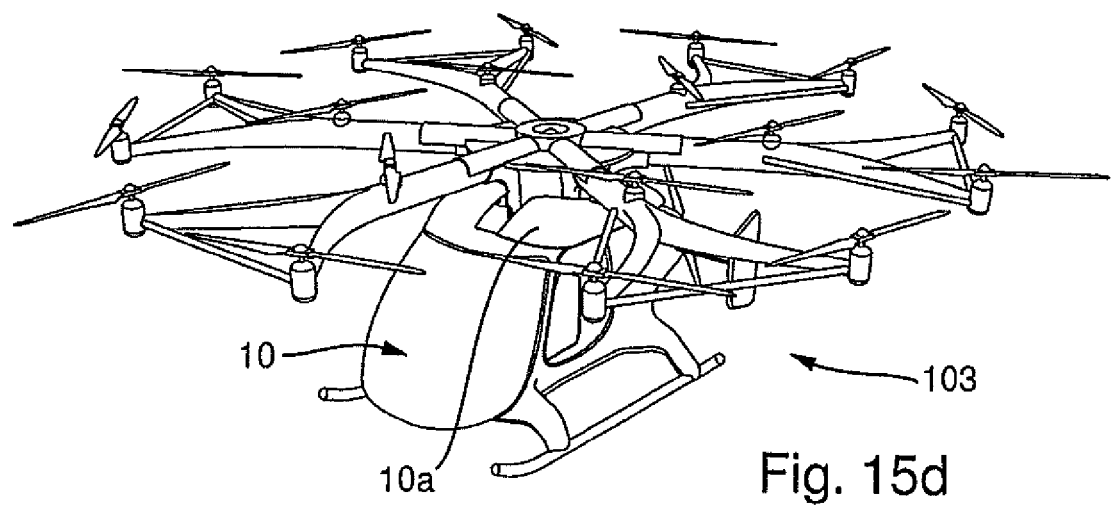
Figure 15E:
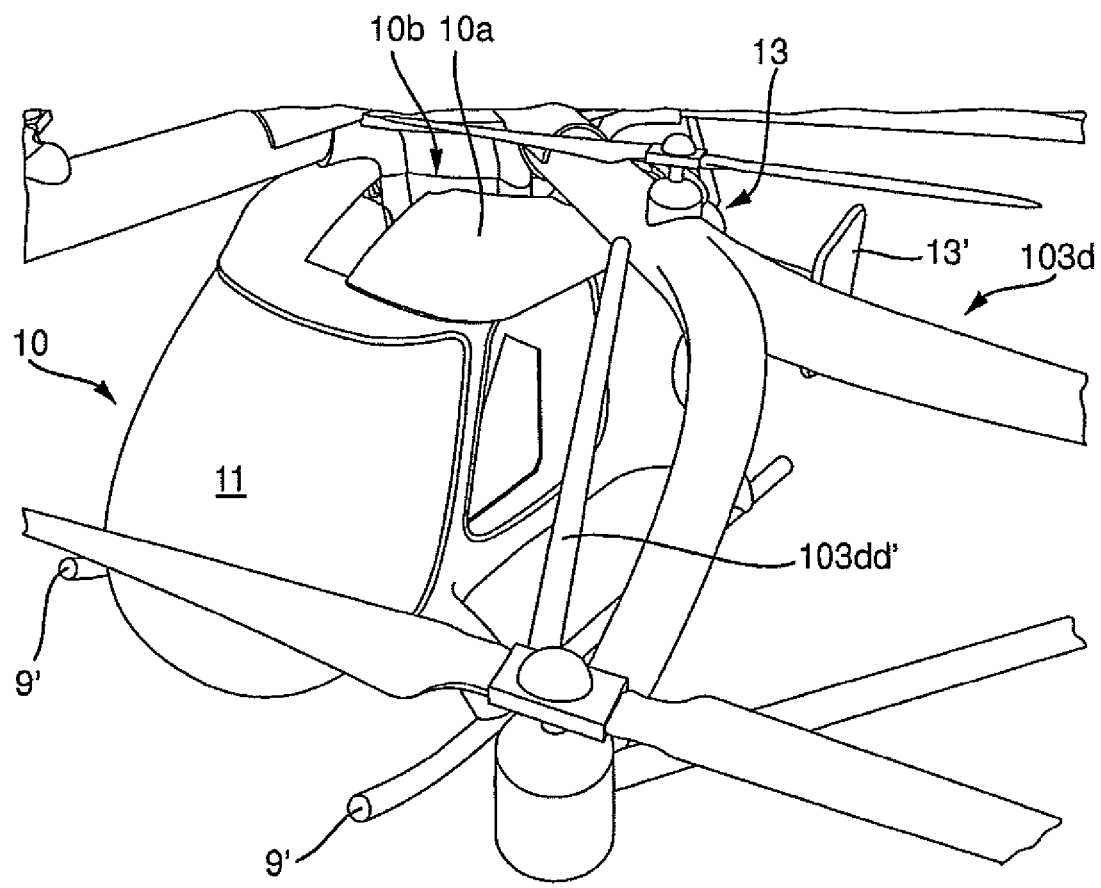

FIG. 15d shows how, in the upper area of the pilot cockpit or cabin 10, a first cover element 10a is removed, which is shown in FIG. 15e in more detail. The cover element 10a has an approximately U-shaped construction in the plan view, for example, according to FIG. 15f, and covers an upper, side area of the pilot cockpit 10, wherein it contacts, with its contour, a central fastening structure 10b for the beams 103a-f, wherein this fastening structure 10b will be discussed in more detail below.

Figure 15F:
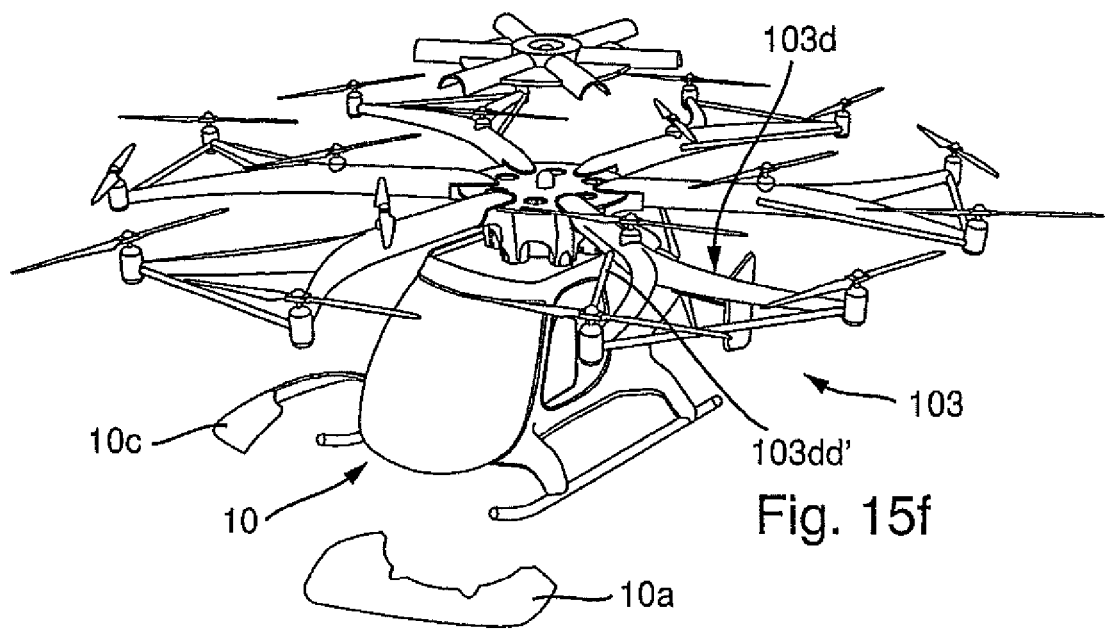

In FIG. 15f, a second cover element 10c that corresponds to the first cover element 10a and covers the other upper side area of the pilot cockpit 10 is also shown.

Figure 15G:
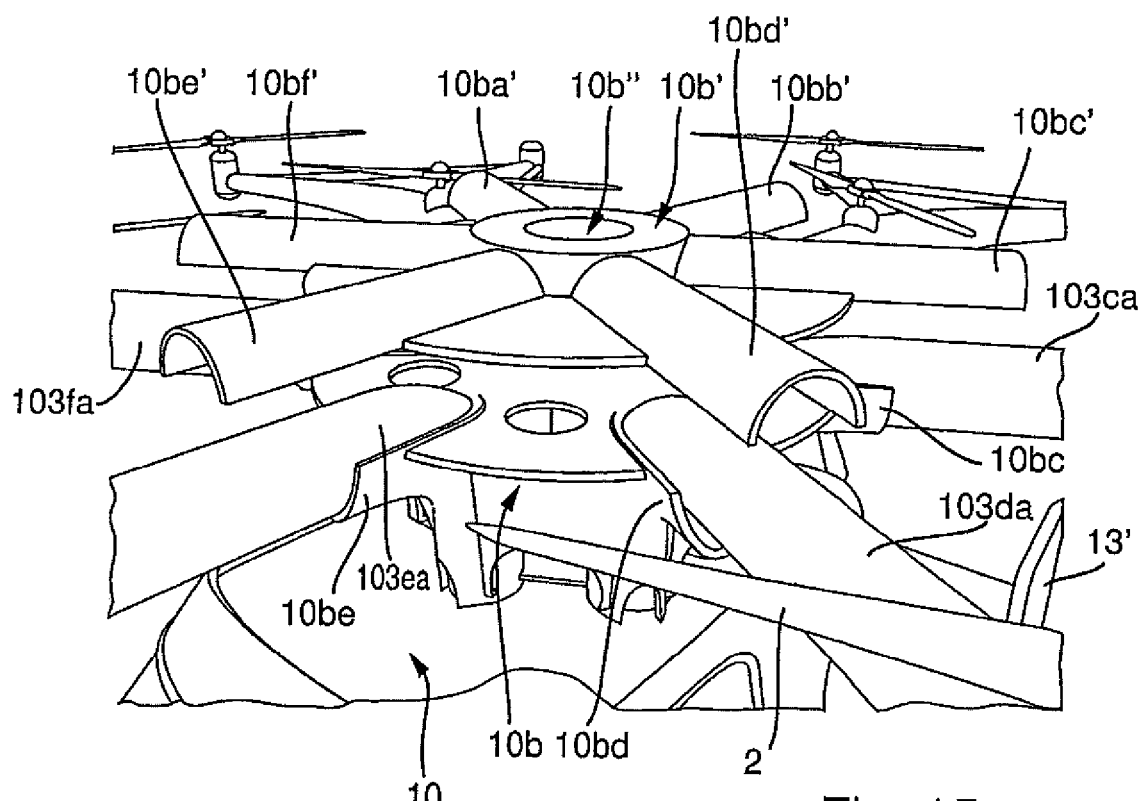

FIG. 15g shows a detail view of the upper area of the pilot cockpit 10 with the central fastening structure 10b that has tubular or groove-shaped receptacles 10ba-10bf of which only some (10bc, 10bd, 10be) can be seen in FIG. 15g due to illustration reasons. The mentioned tubular/groove-shaped receptacles are used for holding the free ends of the first arms, e.g., 103da, 103ea, and 103fa, of beams 103a-f (cf. FIG. 15a). The beams 103a-f are inserted with their free ends of the first arms in the mentioned tubular/groove-shaped receptacles of the central fastening structure 10b and mounted, for example, bolted, there in a way not described in more detail.

In addition, in FIG. 15g, a star-shaped cover element 10b' is shown for covering the central fastening structure 10b, wherein this cover element 10b' has, on its side, groove-shaped projections 10ba'-10bf that are open toward the bottom and are provided for covering the corresponding first arm of the beams 103a-f. The cover element 10b' can be rigidly connected to the central fastening structure 10b, for example, by bolting, in order to distribute forces acting on the beams 103a-f uniformly over the entire arrangement in this way. In its central area, the cover element 10b' has an opening 10b'' within which the emergency parachute 7 (cf., for example, FIGS. 4 and 5) can be arranged. The emergency parachute is in this way protected in an especially good way from external damaging effects, in particular, from a damaging effect by thrown-off, broken propeller parts, which can be caused, for example, if the propellers are hit by a bird.

Figure 15H:
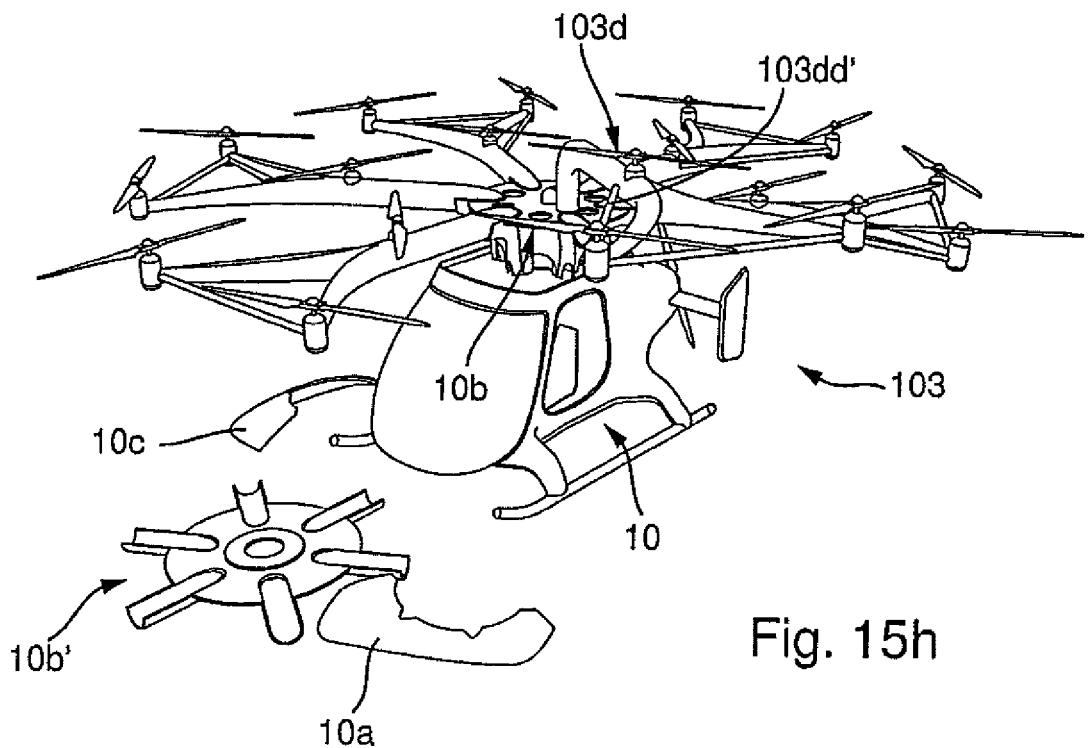

FIG. 15h shows another state of assembly/disassembly of the aircraft 103 with removed cover elements 10a, 10b', and 10c, and also beam 103d pulled upward.

Figure 15I:
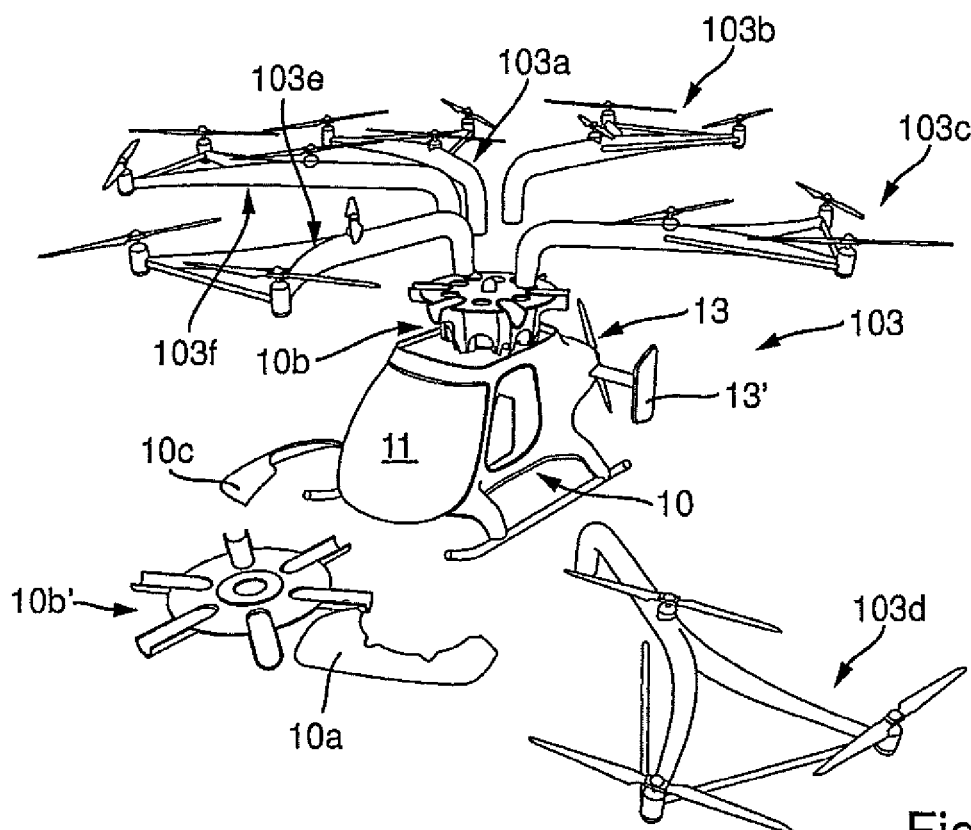
Figure 15J:
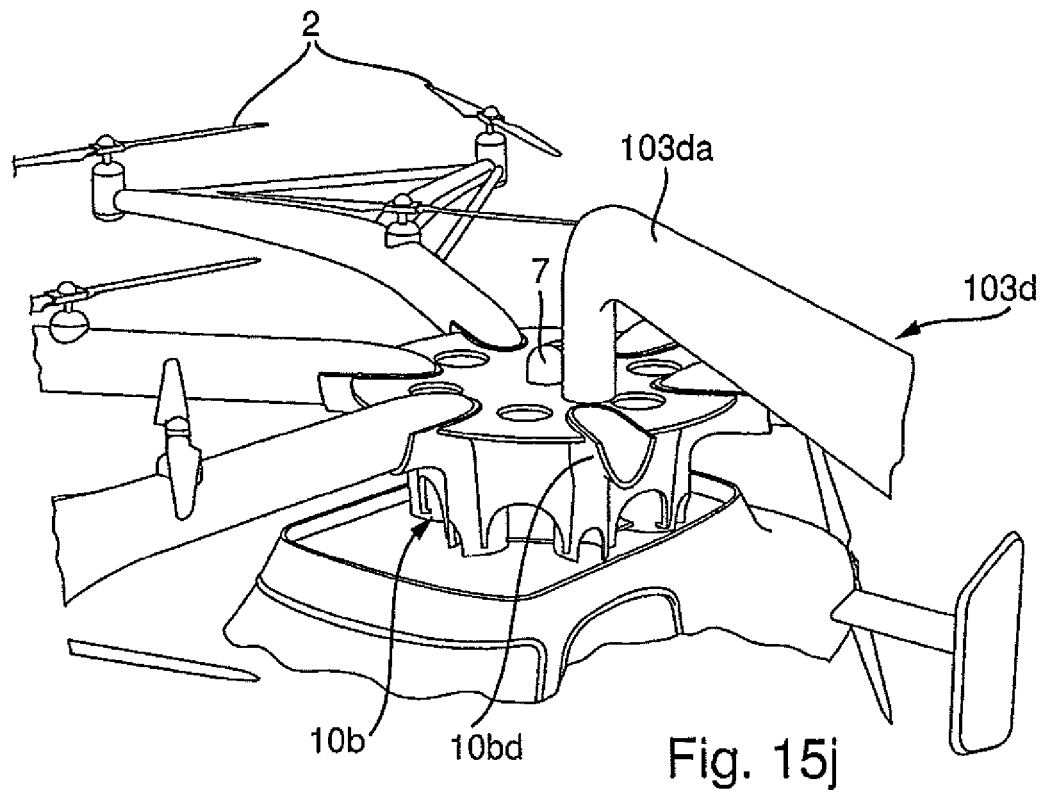

According to the illustration in FIG. 15i, the other beams 103a-c, 103e, 103f have also been pulled upward from the central fastening structure 10b, in order to be able to then stow them in a space-saving arrangement for transport of the aircraft 103.

The illustration in FIG. 15j again shows in detail the construction of the central fastening structure 10b after removal of the associated cover element 10b' (cf. FIG. 15i). Thus, in FIG. 15j, the centrally arranged emergency parachute 7 can also be seen. In addition, from FIG. 15j with a view of the cross-sectional shape of the groove-shaped receptacle 10bd for the beam 103d or its first arm 103da, the construction of the relevant arms with drop-shaped cross section or generally the support structure of an aircraft according to the invention can be seen, so that this is exposed to as little air resistance as possible from an air flow of the propellers 2 directed downward and accordingly has an aerodynamically favorable construction, in order to reduce, in particular, the development of noise. This was already noted above.

Figure 16:
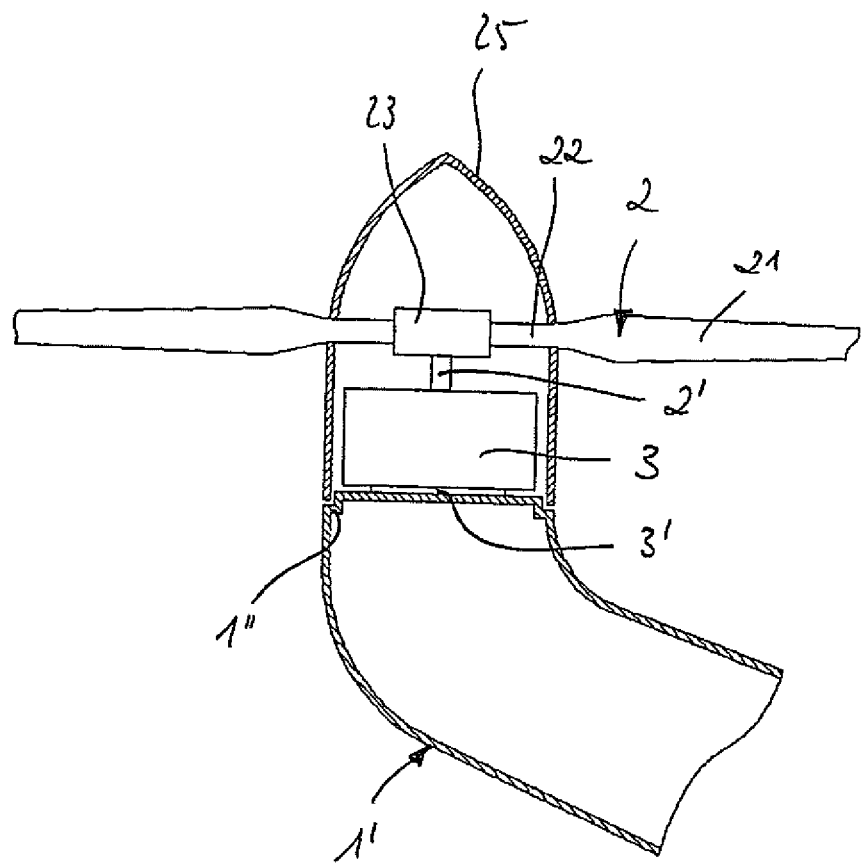
FIG. 16 shows a section through a particular embodiment of a rotor for an aircraft according to the invention.

The illustration in FIG. 16 also relates to an aerodynamically favorable refinement of the aircraft according to the invention, which can be used, in particular, in the construction according to FIGS. 15a-15j. However, the use of the refinement according to FIG. 16 is in no way limited to the construction of the aircraft last described. The sectional view according to FIG. 16 shows, as an example, a propeller 2 with associated propeller shaft 2' and drive electric motor 3, wherein the mentioned arrangement is mounted on a frame part of the aircraft designated in FIG. 16 with the reference symbol 1'. The mentioned frame part 1' can be, for example, the free end of a beam arm according to FIGS. 15a-j. Reference symbol 23 in FIG. 16 designates the rotor hub (cf. FIG. 9).

In the construction according to FIG. 16 it is provided that the rotor hub 23 is provided, including the motor 3, with a conical cover 25 that is typically designated as a "spinner." This increases the aerodynamics and the efficiency of the rotors. The cover or the spinner 25 encloses according to the illustration in FIG. 16 also the motor 3 and transitions from its shape into the frame or the frame part 1'. For this purpose, a peripheral step 1" is constructed on the free end of the frame part so that the cover 25 overlaps the frame part 1 in this area. Although this is not shown in FIG. 16, a seal, for example, a labyrinth seal, can be provided in the overlapping area, in order to protect the motor 3 from moisture, in particular, from spray water.

The flow line shaped cover 25 (the spinner) turns with the rotor or propeller 2. Reference symbol 3' in FIG. 16 designates a motor mount that is used to mount the motor 3 on the frame part 1.

The invention claimed is:

1. A vertical take-off and landing aircraft for transporting people or loads, comprising:
a plurality of electric motors and propellers arranged on a frame support structure, the electric motors driving the propellers,
at least one attitude sensor for attitude control of the aircraft is provided in active signal connection to at least one signal processing unit,
wherein said signal processing unit is configured to automatically perform attitude control based on measurement data of the attitude sensor by controlling a rotational speed of at least one of the electric motors so that the aircraft is always positioned essentially horizontally in space with a surface defined by the propellers without control inputs of a pilot or a remote controller,
wherein the frame structure is at least partially disassemblable into several modules, each module having three arms arranged in a Y-configuration with a propeller located at a distal end of each of the arms, and the aircraft is movable between an operation mode in which the several modules are assembled such that the propellers form a hexagonal arrangement and a transport mode in which the several modules are at least partially disassembled.

2. The aircraft according to claim 1, wherein the frame structure is at least partially disassemblable by hinges provided at module connection points.

3. The aircraft according to claim 1, wherein the frame structure is at least partially disassemblable by a connection mechanism, a pivoting mechanism, or a folding mechanism.

4. The aircraft according to claim 1, wherein the modules comprise a plurality of bars that form the arms that are connected by nodes.

5. The aircraft according to claim 1, wherein the modules comprise a plurality of beams that are disassemblable from a primary support structure of the aircraft.

6. The aircraft according to claim 1, wherein the modules comprise a plurality of beams that are horizontally pivotable relative to a primary support structure of the aircraft.

7. The aircraft according to claim 1, wherein the modules comprise a plurality of beams, each having an angled connection end, and the aircraft further includes a primary support structure with a plurality of receptacles in which the angled connection ends are received in order to allow horizontal pivoting of the beams.

8. The aircraft according to claim 7, wherein the receptacles each include a tubular portion and a groove-shaped portion, the beams each include a first one of the arms extending from the angled connection end, and the angled connection end is inserted in the tubular portion and the first one of the arms rests in the groove-shaped portion.

9. The aircraft according to claim 8, further comprising a cover element having a shape complementary to the first arms in the groove-shaped portions of the receptacles fixed over the first arms.

10. The aircraft according to claim 1, wherein the propellers are arranged in a double hexagonal arrangement with an open center over a cockpit area.

* * * * *